United States Patent
Mueck et al.

(10) Patent No.: US 11,051,225 B2
(45) Date of Patent: Jun. 29, 2021

(54) METHODS AND DEVICE FOR DRONE-BASED NETWORK MANAGEMENT

(71) Applicant: Intel Corporation, Santa Clara, CA (US)

(72) Inventors: Markus Dominik Mueck, Unterhaching (DE); Maria Fresia, Munich (DE); Biljana Badic, Munich (DE)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 16/556,280

(22) Filed: Aug. 30, 2019

(65) Prior Publication Data

US 2019/0394695 A1 Dec. 26, 2019

(51) Int. Cl.
| | |
|---|---|
| *H04W 36/22* | (2009.01) |
| *G05D 1/00* | (2006.01) |
| *H04W 72/04* | (2009.01) |
| *H04W 80/12* | (2009.01) |
| *H04W 4/44* | (2018.01) |
| *B64C 39/02* | (2006.01) |

(52) U.S. Cl.
CPC ........... *H04W 36/22* (2013.01); *B64C 39/024* (2013.01); *G05D 1/0022* (2013.01); *H04W 4/44* (2018.02); *H04W 72/0433* (2013.01); *H04W 80/12* (2013.01)

(58) Field of Classification Search
None
See application file for complete search history.

(56) References Cited

U.S. PATENT DOCUMENTS

| | | | |
|---|---|---|---|
| 10,207,590 B2 * | 2/2019 | Obaidi | B60L 53/12 |
| 2006/0229080 A1 * | 10/2006 | Khan | H04W 48/18 |
| | | | 455/450 |

(Continued)

FOREIGN PATENT DOCUMENTS

WO    WO-2019101321 A1 *  5/2019  ............. G08G 5/006

OTHER PUBLICATIONS

3GPP™; "3rd Generation Partnership Project; Technical Specification Group Services and System Aspects; Telecommunication management; Principles and high level requirements (Release 11)"; pp. 13-21 (67 pages in total); dated Jun. 2014; retrieved from http://www.3gpp.org.

*Primary Examiner* — Rebecca E Song
(74) *Attorney, Agent, or Firm* — Viering, Jentschura & Partner mbB

(57) ABSTRACT

An unmanned aerial vehicle (UAV) configured to operate in a management infrastructure, wherein the management infrastructure includes multiple layers that manage components of a radio communication network for a network provider, the UAV including a vehicle drive arrangement, and one or more processors configured to execute program code for a first layer of the management infrastructure to provide services to one or more first devices in a layer different from the first layer, identify a triggering condition for changing layers in the management infrastructure, identify a second layer of the management infrastructure to change to, and execute program code for the second layer to provide services to one or more second devices in a layer different from the second layer.

17 Claims, 14 Drawing Sheets

(56) References Cited

U.S. PATENT DOCUMENTS

2015/0332523 A1\* 11/2015 Ranasinghe ......... G06K 9/6284
　　　　　　　　　　　　　　　　　　701/34.2
2016/0330771 A1\* 11/2016 Tan ....................... H04W 72/08
2017/0295609 A1\* 10/2017 Darrow .................. G05D 1/104

\* cited by examiner

METHODS AND DEVICE FOR DRONE-BASED NETWORK MANAGEMENT

TECHNICAL FIELD

Various embodiments relate generally to methods and device for drone-based network management.

BACKGROUND

When network providers deploy radio communication networks, they typically provide a management infrastructure to support and manage the various components that compose the radio communication network. The Third Generation Partnership Project (3GPP) has provided one management reference model that it terms the "SA5" architecture. In this SA5 management configuration, a network provider may deploy different network layers in a hierarchy, where upper layers manage lower layers and where those lower layers provide services for the upper layers. With these management infrastructures, a network provider can manage all components of its networks, even when the provider deploys network components that come from multi-vendors and provide different radio access technologies.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Figure 1:
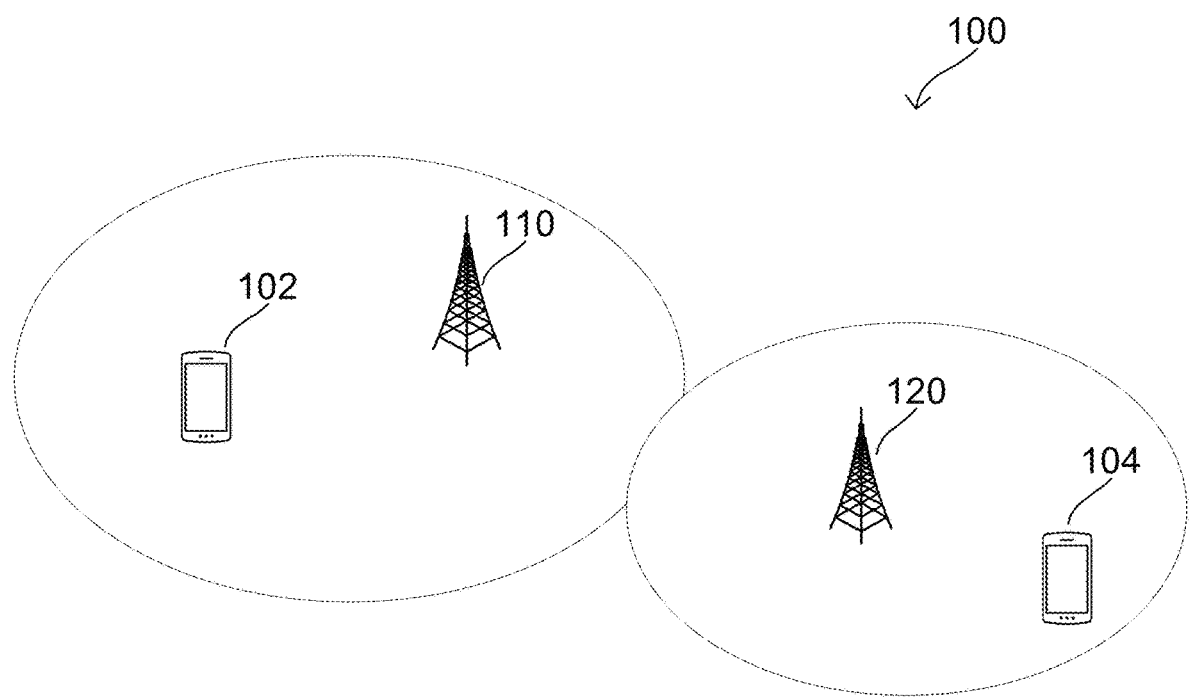
FIG. 1 shows an exemplary radio communication network according to some aspects.

The following detailed description refers to the accompanying drawings that show, by way of illustration, specific details and aspects of embodiments in which the invention may be practiced.

The word "exemplary" is used herein to mean "serving as an example, instance, or illustration." The words "plurality" and "multiple" in the description and claims refer to a quantity greater than one. The terms "group," "set", "sequence," and the like refer to a quantity equal to or greater than one. Any term expressed in plural form that does not expressly state "plurality" or "multiple" similarly refers to a quantity equal to or greater than one. The term "reduced subset" refers to a subset of a set that contains less than all elements of the set. Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

As used herein, "memory" is understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, among others), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(r), Wireless Gigabit Alliance (WiGig) standard, mmWave standards in general (wireless systems operating at 10-300 GHz and above such as WiGig, IEEE 802.11ad, IEEE 802.11ay, among others), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), among others. Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (e.g., allocated for example in US (FCC Part 15)), 863-868.6 MHz (e.g., allocated for example in European Union (ETSI EN 300 220)), 915.9-929.7 MHz (e.g., allocated for example in Japan), 917-923.5 MHz (e.g., allocated for example in South Korea), 755-779 MHz and 779-787 MHz (e.g., allocated for example in China), 790-960 MHz, 1710-2025 MHz, 2110-2200 MHz, 2300-2400 MHz, 2.4-2.4835 GHz (e.g., it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (e.g., allocated for example in the US for Citizen Broadband Radio Service), 5.15-5.25 GHz and 5.25-5.35 GHz and 5.47-5.725 GHz and 5.725-5.85 GHz bands (e.g., allocated for example in the US (FCC part 15), consists four U-NII bands in total 500 MHz spectrum), 5.725-5.875 GHz (e.g., allocated for example in EU (ETSI EN 301 893)), 5.47-5.65 GHz (e.g., allocated for example in South Korea, 5925-7125 MHz and 5925-6425 MHz band (e.g., under consideration in US and EU, respectively, where next generation Wi-Fi system may also include the 6 GHz spectrum as operating band), IMT-advanced spectrum, IMT-2020 spectrum (expected to include 3600-3800 MHz, 3.5 GHz bands, 700 MHz bands, bands within the 24.25-86 GHz range, among others), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, among others), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (e.g., where this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, among others applications.

Aspects described herein can also implement a hierarchical application of the scheme is possible, e.g., by introducing a hierarchical prioritization of usage for different types of users (e.g., low/medium/high priority, among others), based on a prioritized access to the spectrum e.g. with highest priority to tier-1 users, followed by tier-2, then tier-3, and so forth users. Aspects described herein can also be applied to different Single Carrier or OFDM flavors (CP-OFDM, SC-FDMA, SC-OFDM, filter bank-based multicarrier (FBMC), OFDMA, among others) and in particular 3 GPP NR (New Radio) by allocating the OFDM carrier data bit vectors to the corresponding symbol resources. Some of the features in this disclosure are defined for the network side, such as Access Points, eNodeBs, among others. In some cases, a User Equipment (UE) may also take this role and act as an Access Points, eNodeBs, or the like. Some or all features defined for network equipment may be implemented by a UE.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the wireless transmission of radio signals) and logical transmission (e.g., the transmission of digital data over a logical software-level connection). For example, a processor (or controller or physical layer) may transmit or receive data over a software-level connection with another processor (or controller or physical layer) in the form of radio signals, where the physical transmission and reception is handled by radio-layer components such as RF transceivers and antennas, and the logical transmission and reception over the software-level connection is performed by the processors.

In recent years, demand has grown for device-to-device (D2D) communications. Standardization bodies such as the 3$^{rd}$ Generation Partnership Project (3GPP) have introduced their own D2D protocols that devices can use to discover and communicate with nearby devices over direct links. In the 3GPP D2D scheme, known as Proximity Services (ProSe), devices can communicate directly with each other with the existing 3GPP Long Term Evolution (LTE) standard. However, because ProSe operates on licensed spectrum, ProSe devices may have limited range, and may also face high load from normal cellular communications. Moreover, there are many use cases where ProSe is not a comprehensive solution. As standardized by the 3GPP, ProSe devices rely on the cellular network to help discover other devices and to manage connection reliability. Thus, even though ProSe devices can communicate with devices outside of network coverage (either directly or with relays), ProSe may not work properly when the network is unavailable. For instance, when an emergency or disaster scenario disables the network, ProSe devices may have difficulty discovering each other, and may have issues maintaining reliable links with low latency and limited interference.

In sum, while ProSe provides many useful features, it is not a comprehensive solution. Many other commercial D2D solutions have the same or similar drawbacks. Recognizing these limitations, aspects of this disclosure propose a network architecture that uses unmanned aerial vehicles (UAVs) to provide part or all of the management infrastructure that supports the network. Using the 3GPP system architecture from 3GPP TS 32.101 (Release 11) as an example, different UAVs may provide the features of operation services (OSs), such as the network managers (NMs), domain managers (DMs), equipment managers, and/or the features of network elements (NEs). The UAVs may arrange themselves to form a fully functional management infrastructure to support a radio access network for users to access. This approach may be highly flexible, where the UAVs can move to different physical locations, change management roles, adapt wireless interfaces, and dynamically add or remove themselves from the management infrastructure. As they are mobile, the UAVs may also use D2D links to communicate with each other. These aspects may provide numerous advantages, including a more adaptable network that can re-position and re-organize itself in response to changing network conditions.

This disclosure will first outline a radio communication network, followed by a detailed description of various aspects of this disclosure. FIG. 1 shows exemplary radio communication network 100 according to some aspects. Radio communication network 100 may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G NR, mmWave, etc.), these examples may incorporate any other type or configuration of radio access network.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network, such as an Evolved Packet Core (EPC, for LTE), 5$^{th}$ Generation Core (SGC, for 5G NR), or another type of cellular core network. The cellular core network may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 may therefore provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network. The core network may provide switching, routing, and transmission, for traffic data related to terminal devices 102 and 104. The core network may also provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable) of radio communication network 100 may be governed by communication protocols that vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Terminal devices 102 and 104 and network access nodes 110 and 120 may therefore follow the defined communication protocols to transmit and receive data over the radio access network of radio communication network 100. The core network may follow the defined communication protocols to route data within and outside of the core network. Exemplary communication protocols include LTE, UMTS, GSM, WiMAX, Bluetooth, WiFi, 5G NR, mmWave, and so on, any of which may be applicable to radio communication network 100.

Figure 2:
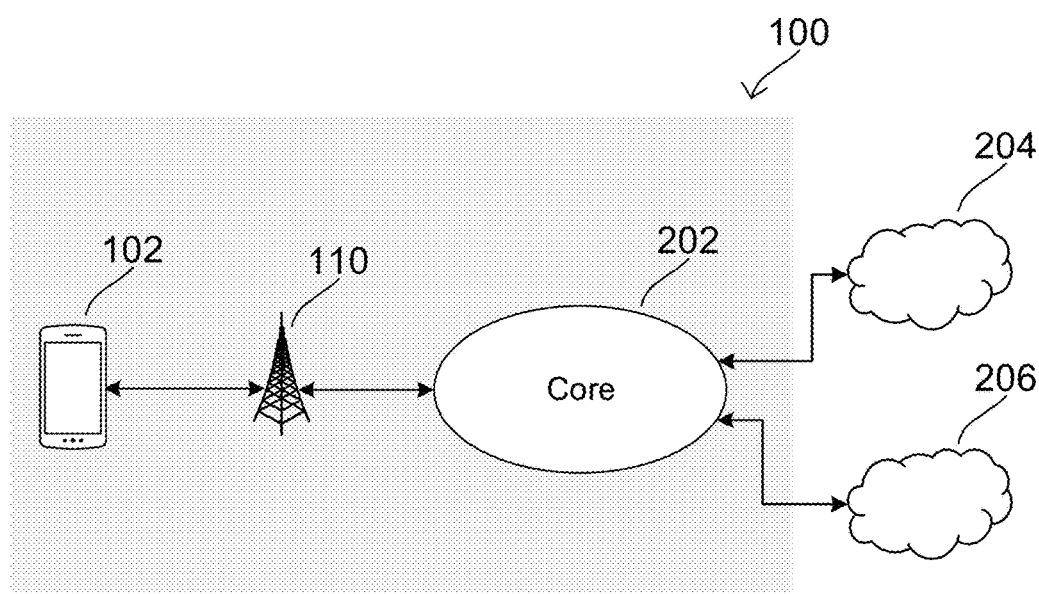
FIG. 2 shows an exemplary radio access network interfaced with a core network according to some aspects.

As previously indicated, network access nodes 112 and 114 may interface with a core network. FIG. 2 shows an example where network access node 110 interfaces with core network 202, which may be, for example, a cellular core network. Core network 202 may provide a variety of functions to manage operation of radio communication network 100, such as data routing, authenticating and managing users/subscribers, interfacing with external networks, and various other network control tasks. Core network 202 may therefore provide an infrastructure to route data between terminal device 104 and various external networks such as data network 204 and data network 206. Terminal device 104 may thus rely on the radio access network provided by network access node 110 to wirelessly transmit and receive data with network access node 110, which may then provide the data to core network 202 for further routing to external locations such as data networks 204 and 206 (which may be packet data networks (PDNs)). Terminal device 104 may therefore establish a data connection with data network 204 and/or data network 206 that relies on network access node 110 and core network 202 for data transfer and routing.

A network provider (e.g., a mobile network operator (MNO)) may manage radio communication network 100 as a public land mobile network (PLMN). The network provider may be responsible for deploying and maintaining the radio access and core network components that make up radio communication network 100. To do so, the network provider may deploy a management infrastructure that supports radio communication network 100. Using an exemplary 3GPP architecture from 3GPP TS 32.101 (Release 11), the network provider may deploy radio communication network 100 with different operations systems (OSs) and network elements (NEs). The NEs may be the network nodes that provide user-facing services to terminal devices that connect to radio communication network 100. For instance, in a 3GPP UMTS network, the NEs can include nodeBs, RNCs, and other similar network nodes. Various OSs may then interface with and manage the NEs with management interfaces that connect the various nodes of the management infrastructure. The network provider may then use the OSs to manage operation of radio communication network 100.

Figure 3:
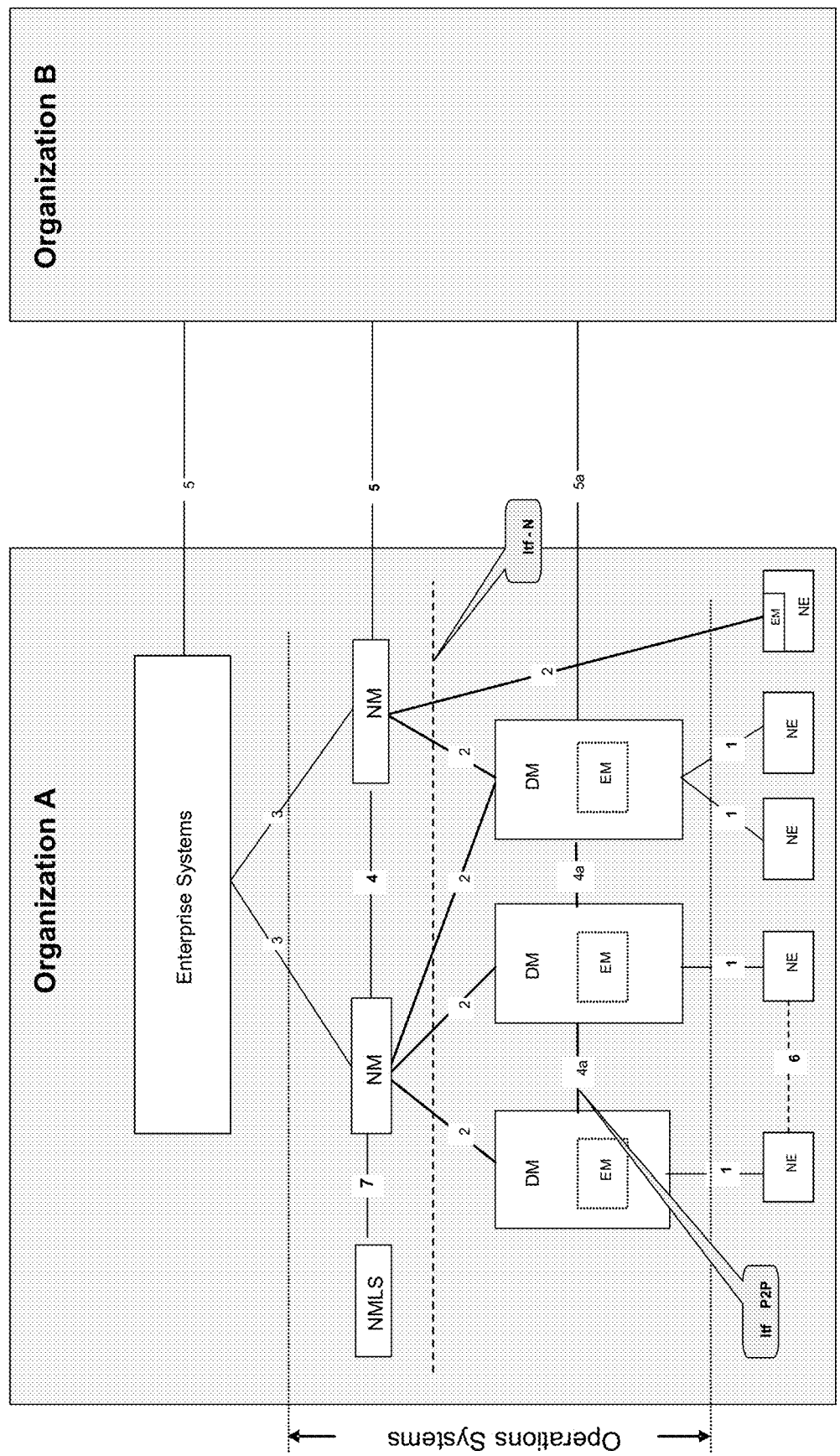
FIG. 3 shows an exemplary management reference model from the Third Generation Partnership Project (3GPP) according to some aspects.

For reference, FIG. 3 shows FIG. 1 from 3GPP TS 32.101 (Release 11; Section 5.1.1: "Overview"). This figure illustrates an example of a management reference model, which network providers may use to manage their radio communication networks. This management reference model was developed by the 3GPP's Service and System Aspects (SA) Technical Specification Group (TSG), which specifies the service requirements and overall architecture for 3GPP. Termed the "SA5" architecture, the 3GPP's management reference model in FIG. 3 may support multiple organizations, such as Organization A and Organization B. Organization A may correspond to a first PLMN while Organization B may correspond to a second PLMN. Taking Organization A as an example, the Enterprise System may form the highest network layer. As defined by the 3GPP, an Enterprise System may be "Information Systems that are used in the telecommunication organisation but are not directly or essentially related to the telecommunications aspects (Call Centre's, Fraud Detection and Prevention Systems, Invoicing etc.)." These Enterprise Systems may be above the OSs in the network hierarchy and may interface with the OSs with management interfaces.

As noted above, the management infrastructure may include various OSs that provide management services to the NEs at the lower network layers. FIG. 3 shows an exemplary hierarchy of OSs that includes Network Managers (NMs), Network Management Layer Services (NMLSs), Domain Managers (DMs), and Element Managers (EMs). These OSs may interface with each other and with various NEs over different management interfaces. The NMs may form the highest network layers among the OSs. Continuing with the 3GPPs definitions, these NMs may provide "a package of end-user functions with the responsibility for the management of a network, mainly as supported by the EM(s) but it may also involve direct access to the Network Elements. All communication with the network is based on open and well-standardized interfaces supporting management of multi-vendor and multi-technology Network Elements." The NMs may interface with one or more DMs, which form the network layer below the NMs. The DMs are often vendor-specific and may operate their own sub-networks. The 3GPP defines these DMs as nodes that provide "element management functions and domain management functions for a sub-network. Inter-working domain managers provide multi vendor and multi technology network management functions." In turn, the DMs may interface with EMs, which provide "provides a package of end-user functions for management of a set of closely related types of network elements. These functions can be divided into two main categories: Element Management Functions and Sub-Network Management Functions." Each EM may then manage a set of NEs, which may provide the user-facing side of the PLMN. Each NE may be "a discrete telecommunications entity, which can be managed over a specific interface, e.g. the RNC."

The 3GPP's definitions are largely abstract, and network providers may have flexibility when deciding how to structure the management infrastructure of their PLMNs. Many network providers, for example, may adopt a multi-vendor strategy, where a provider purchases certain NEs (e.g., discrete base station or core network components) from different vendors. For instance, a network provider like Deutsche Telekom may purchase its network hardware from multiple vendors, such as Huawei, Ericsson, and Nokia. The highest-level network-specific equipment would be the DMs. For instance, the network provider may use a first DM to handle a first sub-network of network equipment provided by a first vendor (e.g., the first vendor's NEs), and a second DM to handle a second sub-network of network equipment provided by a second vendor (e.g., the second vendor's NEs). Since each DM would only manage a sub-network, the network provider may then use an NM to link together the separate DMs to form a unified network. Looking to the lower layers, each DM includes one or more EMs, which in turn manage different sets of related NEs. For instance, the management infrastructure for Organization A may include a first EM that manages a set of NodeBs for its PLMN and a second EM that manages a set of RNCs. The first EM may interface with the NodeBs with a management interface while second EM interfaces with the RNCs with a different management interface. The NodeBs and RNCs may then interface with each other on a different interface, such as the 3GPP Iub interface. This Iub interface may be considered separate from the management interfaces, though it may still carry management information.

Network providers may use management infrastructures like this to manage operation of their various radio communication networks. However, as noted above, many current radio communication networks deploy equipment that is static in both location and function. For instance, the OSs (NMs, DMs, EMs) and NEs (base stations, core network components, and other discrete entities) are generally immobile equipment, such as servers, cabinet boxes, or cell towers. These nodes also maintain the same function over time. A DM, for example, will continue to act as a DM for its specific set of NEs, and will not switch roles.

To provide greater flexibility and mobility, this disclosure proposes to implement a management infrastructure using UAVs. As this disclosure further describes, the UAVs may use special features—such as role changes, wireless interface changes, and network modularity—to provide a more flexible network. Moreover, as the UAVs are mobile, they may be able to dynamically move and adapt to network changes.

Figure 4:
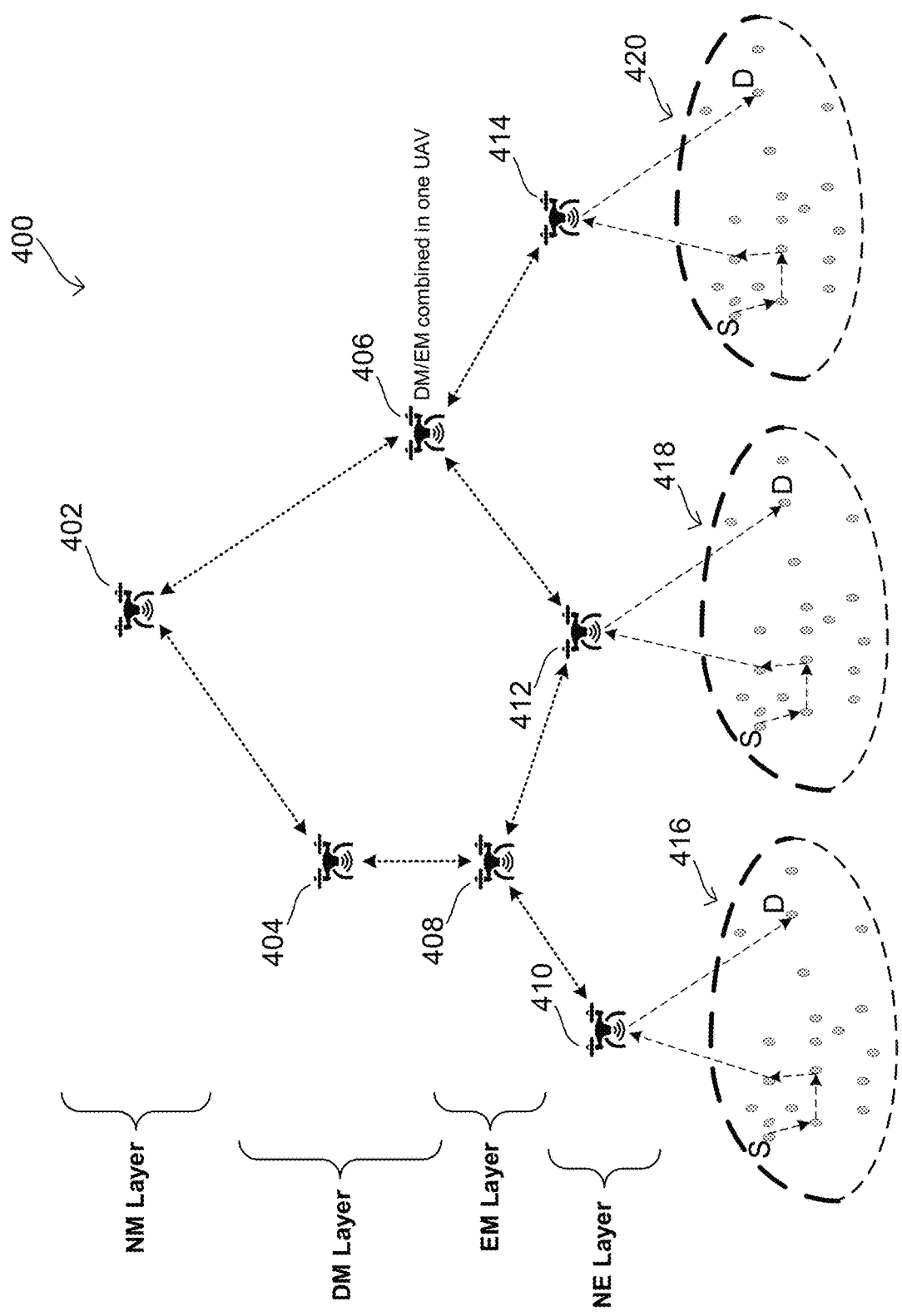
FIG. 4 shows an exemplary drone-based management infrastructure according to some aspects.

FIG. 4 shows exemplary drone-based network management infrastructure 400 according to some aspects. As FIG. 4 shows, drone-based network management infrastructure 400 may include one or more UAVs 402-414. Although FIG. 4 shows an example where each node is a UAV, other aspects of this disclosure may use some fixed nodes and some UAV nodes.

In this example, different UAVs may assume different management roles in the management infrastructure. UAV 402, for example, may operate as the NM layer, which is the highest network layer of OSs (below the Enterprise Systems layer). As previously described, NMs may interface with an manage multiple sub-networks that are overseen by DMs. Thus, UAV 402 may provide NM services to UAVs 404 and 406, which are part of the DM layer. This DM layer is one network layer below and may be the highest network layer of vendor-specific entities. As shown in FIG. 4's example, UAV 404 may interface with UAV 408, which is part of the EM layer located one network layer below the DM layer. UAV 406, on the other hand, may be part of both the DM and EM layer. That is, UAV 406 may act as both a DM and an EM.

The EM layer may then interface with the NE layer, the lowest network layer in the management infrastructure. In FIG. 4, UAVs 410, 412, and 414 may form this NE layer. That is, UAVs 410-414 may act as NEs. UAVs 410-414 may serve a respective coverage area. For instance, UAV 410 may serve coverage area 416, UAV 412 may serve coverage area 418, and UAV 414 may serve coverage area 420. In some cases, UAV 410 may be, for example, a base station that provides a radio access network to terminal devices in coverage area 416. In other cases, coverage area 416 may include base stations (e.g., fixed or mobile), and UAV 410 may act as a higher-layer NE (e.g., an RNC or core network entity) that provides a higher-layer service to the base stations (e.g., as an EM layer)

Figure 5:
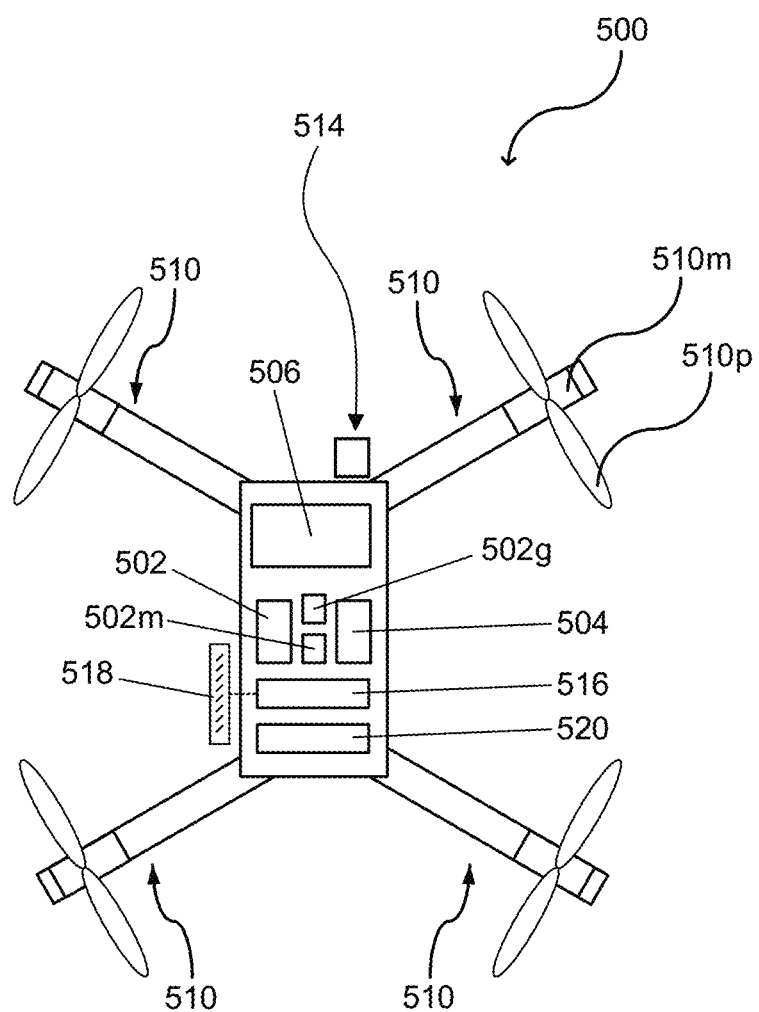
FIG. 5 shows an exemplary internal configuration of an unmanned aerial vehicle (UAV) according to some aspects.
Figure 6:
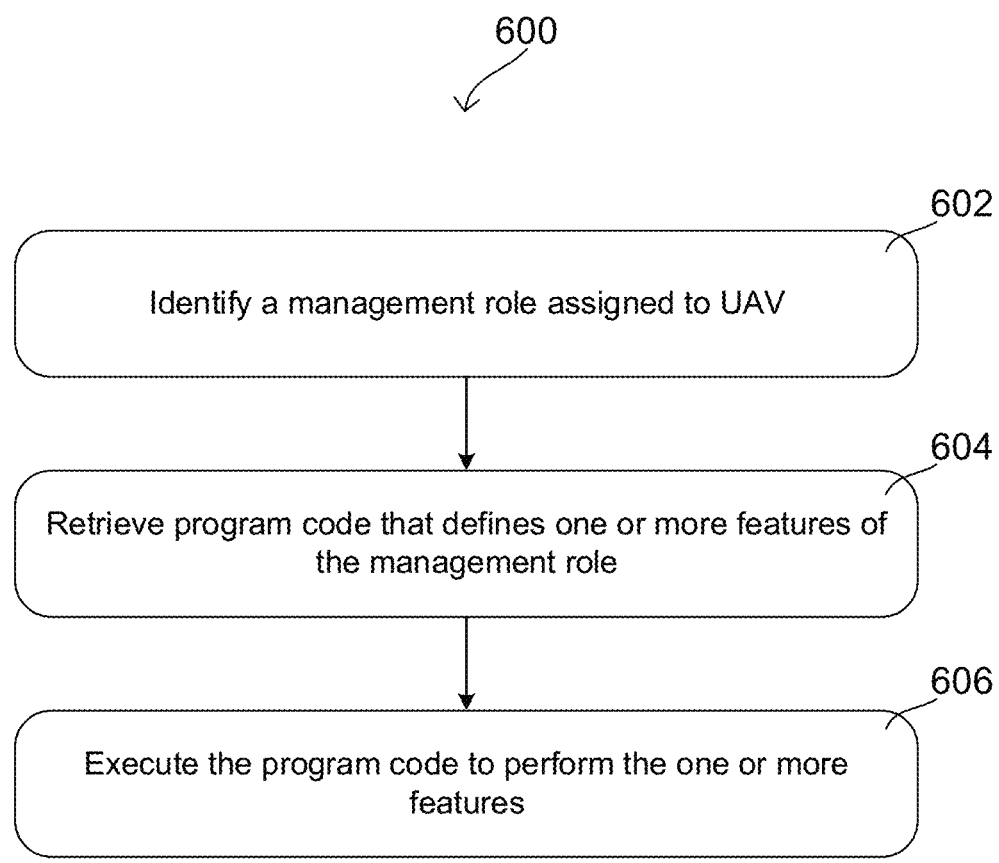
FIG. 6 shows an exemplary flow chart for performing a management role at a UAV according to some aspects.

UAVs 402-414 may thus be configured to execute program code that defines the various network layer features for OSs and/or NEs. FIG. 5 shows an exemplary internal configuration of UAV 500 according to some aspects. UAVs 402-414 may be configured in a same or similar manner. As shown in FIG. 5, UAV 500 may include a plurality of vehicle drive arrangements 510. Each of the vehicle drive arrangements 510 may include at least one drive motor 510$m$ and at least one propeller 510$p$ coupled to the at least one drive motor 510$m$. The one or more drive motors 510$m$ of UAV 500 may be electric drive motors.

UAV 500 may also include one or more navigation processors 502$p$ configured to control flight or any other operation of UAV 500. These operations may include, for example, navigation, image analysis, location calculation, and any method or action described herein. One or more of the navigation processors 502$p$ may be part of a flight controller or may implement a flight controller. The one or more navigation processors 502$p$ may be configured, for example, to provide a flight path based at least on an actual position of UAV 500 and a desired target position for UAV 500. In some aspects, the one or more navigation processors 502$p$ may control UAV 500. In some aspects, the one or more navigation processors 502$p$ may directly control the drive motors 510$m$ of UAV 500, so that in this case no additional motor controller may be used. Alternatively, the one or more navigation processors 502$p$ may control the drive motors 510$m$ of UAV 500 via one or more additional motor controllers. The one or more navigation processors 502$p$ may include or may implement any type of controller suitable for controlling the desired functions of UAV 500. The one or more navigation processors 502$p$ may be implemented by any kind of one or more logic circuits.

According to various aspects, UAV 500 may include one or more memories 502$m$. The one or more memories may be implemented by any kind of one or more electronic storing entities, e.g. a one or more volatile memories and/or one or more non-volatile memories. The one or more memories 502$m$ may be used, e.g., in interaction with the one or more navigation processors 502p, to build and/or store image data, ideal locations, locational calculations, or alignment instructions.

UAV 500 may also include one or more power supplies 504. The one or more power supplies 504 may include any suitable type of power supply, e.g., a directed current (DC) power supply. A DC power supply may include one or more batteries (e.g., one or more rechargeable batteries), etc.

According to various aspects, UAV 500 may include one or more sensors 506. The one or more sensors 506 may be configured to monitor a vicinity of UAV 500. The one or more sensors 506 may be configured to detect obstacles in the vicinity of UAV 500. The one or more sensors 506 may include, for example, one or more cameras (e.g., a depth camera, a stereo camera, a thermal imaging camera, etc.), one or more ultrasonic sensors, etc. The UAV 500 may further include a position detection system 502g. The position detection system 502g may be based, for example, on Global Positioning System (GPS) or any other available positioning system. Therefore, the one or more navigation processors 502p may be further configured to modify the flight path of UAV 500 based on data obtained from the position detection system 502g. The sensors 506 may be mounted as depicted herein, or in any other configuration suitable for an implementation.

As FIG. 5 shows, UAV 500 may also include communication chip 516 and antenna 518. Communication chip 516 may be configured to transmit and receive communication data with other devices with wireless links provided by antenna 518. In some aspects, communication chip 516 may include a baseband modem and an RF transceiver. In the receive direction, antenna 518 may receive a radio signal and provide the resulting analog radio frequency signal to the RF transceiver. The RF transceiver may downmix the analog radio frequency signal (e.g., to baseband or to an intermediate frequency (IF)) and perform analog-to-digital conversion (ADC). This produces baseband data (e.g., a stream of baseband samples, such as in-phase and quadrature (IQ) samples). The RF transceiver may provide this baseband data to the baseband modem in communication chip 516. The baseband modem may then perform physical layer (PHY) receive processing on the baseband data (e.g., with a digital signal processor (DSP)). Higher protocol stack layers (e.g., executed on a protocol processor of the baseband modem) may then perform further layer-specific processing on the baseband data according to a communication protocol. This communication protocol can be, for example, ProSe, another D2D communication protocol, or any other radio communication protocol. In this manner, UAV 500 may receive data from base stations, terminal devices, other UAVs, and/or any other device with wireless communication capabilities.

In the transmit direction, the higher protocol stack layers may produce baseband data for transmission to other devices. The baseband modem of communication chip 516 may then perform PHY layer transmit processing on the baseband data and provide the resulting baseband data to the RF transceiver. The RF transceiver may perform digital-to-analog (DAC) conversion and upmixing to convert the baseband data into an analog radio frequency signal. Using antenna 518, the RF transceiver may then wirelessly transmit the analog radio frequency signal to the other devices. UAV 500 may transmit data to base stations, terminal devices, other UAVs, and/or any other device with wireless communication capabilities.

As introduced above, UAV 500 also be configured with management infrastructure features. Accordingly, UAV 500 may also include one or more management processors 520. Management processors 520 may be configured to retrieve and execute program code that defines the various management features described herein. Management processors 520 may interface with communication chip 516, and may use communication chip 516 to provide a wireless link with other devices. In some aspects, management processors 520 may use these wireless links to transmit and receive data with other UAVs that are also part of the management infrastructure. For instance, after communication chip 516 processes baseband data received from another UAV, it may provide the baseband data to management processors 520. Similarly, management processors 520 may provide upper-layer data to communication chip 516 for transmission to another UAV. Thus, management processors 520 may use these wireless links as the wireless management interfaces for exchanging management information with other nodes (UAVs) that form the management infrastructure.

Referring back to exemplary drone-based management infrastructure 400 in FIG. 4, UAVs 402-414 may be configured to act as NMs, DMs, EMs, or NEs. Thus, management processors 520 of UAV 500 may be configured to retrieve and execute program code that defines the features of various management roles including NMs, DMs, EMs, and/or NEs. UAV 500 may store this program code in a local memory, and/or may wirelessly download it when needed.

FIGS. 6-9 show exemplary flowcharts detailing how UAV 500 executes a management role according to various aspects. Starting with FIG. 6, flowchart 600 describes a general operation of UAV 500 within a management infrastructure according to some aspects. UAV 500 may execute flowchart 600 with management processors 520. During that execution, UAV 500 may also use its other components to move and/or communicate with other devices.

In stage 602, UAV 500 may first identify a management role assigned to UAV 500. For instance, UAV 500 may be assigned to one of the network layers in management infrastructure 400, such as to the NM layer, the DM layer, the EM layer, or the NE layer. These correspond to the management roles. For instance, if UAV 500 is assigned to the DM layer, UAV 500 may be assigned to an DM role. That is, UAV 500 may be responsible for providing DM services to manage a sub-network of EMs and NEs (e.g., according to the 3GPP definition of the DM OS). This similarly holds for when UAV 500 is assigned to an NM role, EM role, or NE role, where UAV 500 would manage lower network layers (e.g., UAVs assigned to management roles in lower network layers) and provide services on request for higher network layers (e.g., UAVs assigned to management roles in higher management layers).

In some cases, UAV 500 may have been previously assigned, or may have previously selected, its management role in the management infrastructure. That assignment or selection can happen when the management infrastructure is first initiated, when UAV 500 joins the management infrastructure, or when UAV 500 switches management roles within the management infrastructure. Those actions are described in full when discussing FIGS. 7-10 In any case, UAV 500 may have a management role, and management processors 520 may identify that management role in stage 602.

After identifying the management role, management processors 520 may retrieve program code that defines the management role in stage 604. For example, each management role (e.g., NM, DM, EM, or NE) may have a predefined set of features unique to it. The specific features may depend on how the network provider decides to implement its management infrastructure. For instance, network providers may assign their DMs different features depending on which vendors provide the EM and NE equipment, or may assign their NMs different features depending on how large the network is (e.g., how many different DM subnetworks a given NM is expected to manage). The features for each management role may generally follow the expectations from, for example, the 3GPP definitions of the layers in the management infrastructure. For instance, the features for the NM role may provide a package of end-user functions for managing the entire network (e.g., for managing different DM subnetworks), mainly as supported by the EMs but potentially also by directly interfacing with NEs. As NMs are capable of managing a network composed of equipment from multiple vendors, the NM role's features may include communicating with open and standardized management interfaces of multi-vendor and multi-technology NEs. The features of the DM role, to take another example based on the 3GPP definition, may focus on managing a subnetwork, and so may provide element and domain management functions for managing subnetwork. In yet another example, the EM role may have features that provide a package of end-user functions for managing a set of related types of NEs. Finally, features for NEs may include operating a particular discrete telecommunications entity, such as the operations of a base station or core network component.

The features for each management role may be defined as program code, and either stored locally in UAV 500's memory or downloaded wirelessly from a server or other node. Thus, in stage 604 management processors 520 may retrieve the program code that defines the features of the management role.

Management processors 520 may then execute the program code in stage 606. Under the direction of the program code, UAV 500 may perform the features of its assigned management role. For instance, if UAV 500 is in an NM role, UAV 500 may provide a package of end-user functions for managing the entire network, which can include overseeing multiple DM subnetworks, managing the EMs, and/or interfacing directly with and controlling NEs. If UAV 500 is in a DM role, UAV 500 may manage a subnetwork and provide element and domain management functions. If UAV 500 is in an EM role, UAV 500 may provide a package of end-user functions for managing a set of related types of NEs. If UAV 500 is in an NE role, UAV 500 may operate a discrete telecommunications entity.

In many cases, the features for a given management role may include local processing tasks and/or communication tasks. For instance, when UAV 500 executes a given feature of a management role, management processors 520 may perform a sequence of local processing and/or communication tasks that define the feature. Local processing tasks may include network management tasks where, as part of its management role, UAV 500 processes data, such as to manage a lower network layer or to provide a requested service for a higher network layer. When performing such features, management processors 520 may perform the processing of the feature. Communication tasks are those where UAV 500 transmits or receives management information with another UAV in the management infrastructure. The other UAV can be in the same network layer or in a different network layer. When performing these communication tasks, management processors 520 may transmit or receive management information with other UAVs, and may use communication chip 516 and antenna 518 to wirelessly transmit and/or receive data over a wireless management interface.

In some aspects, UAV 500 may be configured to change its management role within the management infrastructure. For instance, UAV 500 may initially be in a first management role (associated with a first network layer), but may switch to assume a second management role. This adaptability may provide the management infrastructure with greater flexibility. For instance, if a UAV moves too far away from the other UAVs, or if user demand increases in a given area, another UAV can change its management role to take over. Thus, even though the nodes of the management infrastructure are mobile UAVs, the management infrastructure can adapt and continue to reliably support the network.

Figure 7:
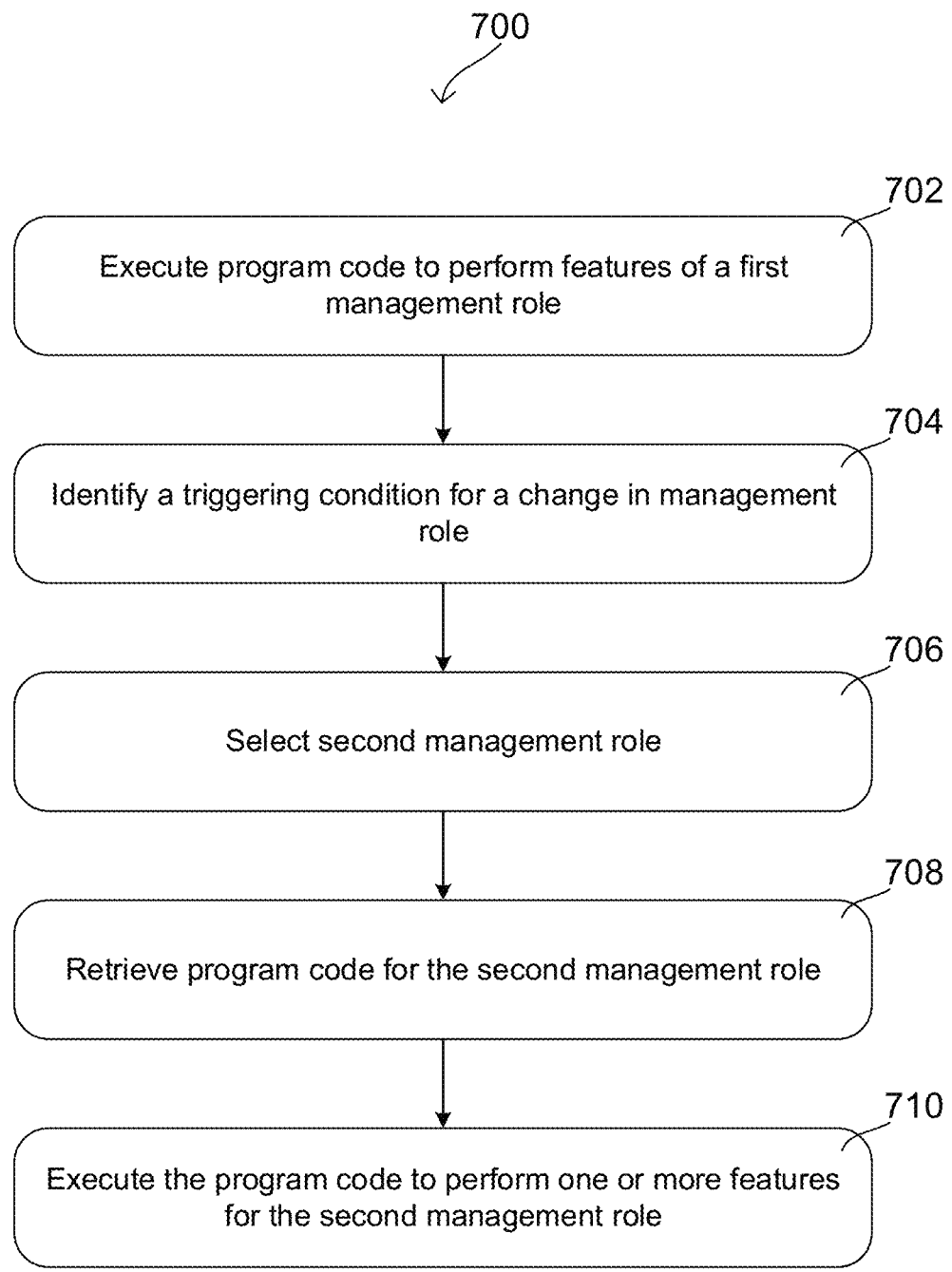
FIG. 7 shows an exemplary flow chart for changing management roles at a UAV according to some aspects.

FIG. 7 shows exemplary flowchart 700, which describes such a role change operation according to some aspects. As shown in FIG. 7, UAV 500 may first, in stage 702, execute program code to perform features of a first management role in the management infrastructure. For instance, UAV 500 may initially be assigned to an NM role, and management processors 520 may retrieve and execute program code that defines the features of an NM role. Under the control of that program code, UAV 500 may perform local processing and communication tasks to act as an NM within the management infrastructure. In other examples, UAV 500 may initially operate as a DM, EM, NE, or any other management role within the management infrastructure.

Then, in stage 704, management processors 520 may identify a triggering condition for a change in the management role. This triggering condition can be any scenario or criteria that indicates UAV 500 should change its management role. In some aspects, management processors 520 may identify the triggering condition based on observations of the network around UAV 500. For instance, UAV 500 may monitor the management infrastructure and autonomously decide to switch its management role. In one example, management processors 520 may monitor the number of target devices it needs to serve, where the targets can be terminal devices, NEs, or OSs in a network layer below UAV 500's network layer. That is, a target device in this context can include any device that UAV 500 is responsible for serving, whether that includes managing UAVs in a lower network layer or providing connectivity to terminal devices. If the number of target devices exceeds a threshold number, management processors 520 may determine the triggering condition is met in stage 704. Management processors 520 may then proceed to stage 706.

In another example, management processors 520 may identify the triggering condition in stage 704 based on UAV 500's battery power level. Management processors 520 may monitor the remaining battery power level of UAV 500 and determine whether it falls below a predefined threshold. If so, management processors 520 may determine that the triggering condition is met and proceed to stage 706.

In a further example, management processors 520 may identify the triggering condition based on the position of UAV 500. For instance, management processors 520 may monitor UAV 500's position and identify the triggering condition based on how far UAV 500 is from other UAVs in the management infrastructure or from terminal devices the management infrastructure is serving (such as if UAV 500 is acting as an NE, like a base station). If UAV 500's position indicates that it has moved too far from the other UAVs, or too far from the terminal devices, management processors 520 may identify that the triggering condition is met, and may proceed to stage 706. In some cases, management processors 520 may use a geopositional sensor of UAV 500 to determine UAV 500's position. Management processors 520 may then use position reports (e.g., signaling that indicates positions) or radio measurements to determine the positions of other management infrastructure nodes. For instance, management processors 520 may use radio measurements (from communication chip 516) to estimate the distance between UAV 500 and other devices, or may receive position reports from other devices that indicate their positions. Management processors 520 may then determine whether UAV 500 is too far from those other devices based on the determined positions, such as based on whether an average distance of devices exceeds a threshold.

In other examples, UAV 500 may identify the triggering condition based on external signaling. For instance, management processors 520 may receive a signaling message from another requesting UAV that requests UAV 500 to change its management role. In some cases, the requesting UAV may request for UAV 500 to take over the requesting UAV's role in the management infrastructure. For instance, the requesting UAV may determine that its battery power level is depleted, and may thus generate and transmit a signaling message that requests another UAV to take over its management role. In another example, the requesting UAV may transmit the signaling message because it has determined that it has moved too far from the other management infrastructure nodes or target devices. In other cases, the requesting UAV may request for UAV 500 to take over another management role. For example, the requesting UAV may determine that it cannot serve all of the terminal devices around it (e.g., that demand is too high), or that it cannot serve all the UAVs in the network layer below it (e.g., too many DMs for it to support as an NM). In such cases, the requesting UAV may not be able to meet the demands of its management role, and may transmit a signaling message to request another UAV to assist it by duplicating its same management role.

In any case, UAV 500's communication chip 516 may receive the signaling message via antenna 518 and may provide the signaling message to management processors 520. Management processors 520 may identify the triggering condition in stage 704 by determining that the signaling message request UAV 500 to change its management role.

Thus, there are different scenarios where management processors 520 identify the triggering condition in stage 704. Some examples above used internal triggers, such as where management processors 520 monitor the surrounding network and autonomously trigger a change in management role. Other examples used external triggers, such as where a requesting UAV transmits a signaling message that requests another UAV to change its management role. In any case, management processors 520 may identify in stage 704 a triggering condition for a change in management role.

After identifying the triggering condition, management processors 520 may select a second management role in stage 706. Using FIG. 4 as an example, the second management role may be in a different network layer than the first management role. For instance, the first management role may be an NM role, while the second management role may be a DM, EM, or NE role. In another example, the first management role may be a DM role while the second management role may be an NM, EM, or NE role. In any case, when UAV 500 changes from the first to the second management role, it may move up or down the hierarchy of management roles in the management infrastructure. In some aspects, management processors 520 may autonomously identify the second management role in stage 706. For instance, when management processors 520 identify the triggering condition, they may select the second management role based on predefined criteria. In one example, management processors 520 may determine that a network layer has too much demand (e.g., is serving too many target devices) and may then switch from its current management role to a second management role in that network layer. In some cases where management processors 520 identify the triggering condition by receiving a signaling message from a requesting UAV, the signaling message may specify the second management role. That is, the requesting UAV may use the signaling message to request for another UAV to take over a specific management role. Management processors 520 may identify that information in the signaling message, and may then select the specific management role as the second management role in stage 706.

After selecting the second management role, UAV 500 may begin operating in the second management role. As FIG. 7 shows, management processors 520 may retrieve program code for the second management role in stage 708. Like described above for stage 604 in FIG. 6, UAV 500 may store or download program code that defines the features of the second management role. Management processors 520 may thus retrieve that program code in stage 708.

Then, in stage 710 management processors 520 may execute the program code for the second management role. Management processors 520 may also stop executing the program code for the first management role, and therefore may change its role from the first management role to the second management role. Like for the first management role, executing the program code may cause management processors 520 to perform one or more features of the second management role. These features may include, for example, predefined sequences of different local processing and/or communication tasks that are part of the second management role. For instance, when executing program code for an NM role, UAV 500 may perform the features of an NM node. UAV 500 may likewise perform the features of DM, EM, and NE when executing program code for DM, EM, and NE roles, respectively. As described above, the 3GPP management reference model is flexible. Thus, the specific features for each of those roles may depend on how the network provider decides to structure its management infrastructure.

Accordingly, UAV 500 may be configured to adaptively change its management role in the management infrastructure with flow chart 700. This may help the management infrastructure adapt to changes in its structure as well as to changes in the users it serves. For instance, if a UAV acting as a management node moves too far from the other management nodes, or too far from the target devices, the other UAVs may change roles to cover for the absent UAV. Similarly, if a UAV depletes its battery power, another UAV can step in and take over for its role.

Some examples described above for FIG. 7 discussed how a requesting UAV can transmit signaling messages that request another UAV to change its management role. In the examples described above, UAV 500 may perform flow chart 700 to change its management role in response to receiving one of those signaling messages. In other examples, UAV 500 may act as the requesting UAV. For instance, UAV 500's management processors 520 may decide that another UAV should change its management role, such as for any of the reasons described above. UAV 500's management processors 520 may then generate and transmit a signaling message that requests for another UAV to change its management role.

The above examples for FIG. 7 focused on scenarios where UAV 500 switches management roles within the management infrastructure. In some aspects, UAVs may be configured to adaptively join or leave the management infrastructure. This provides an extra degree of network modularity, where the management infrastructure may be able to "plug in" or "plug out" UAVs in a dynamic manner. For example, there may be a large public event, such as a sporting event in a stadium or arena, that draws a large number of users. Instead of manually deploying a fixed management infrastructure, aspects of this disclosure may use these network modularity features to quickly and efficiently establish a management infrastructure to cover the area of interest. For instance, aspects of this disclosure may establish a management infrastructure by adding UAVs to form network layers of NMs, DMs, EMs, and/or NEs. Once added to the management infrastructures, these UAVs may perform the features of their assigned management roles, thus providing a management infrastructure to support the radio access network provided to the area of interest.

These features can be used both to create a full management infrastructure or to supplement an existing one. For example, if a group of UAVs is providing a management infrastructure but needs to supplement one or more network layers (e.g., due to high demand by the target devices), that group of UAVs may transmit signaling that requests other UAVs to join the management infrastructure.

Figure 8:
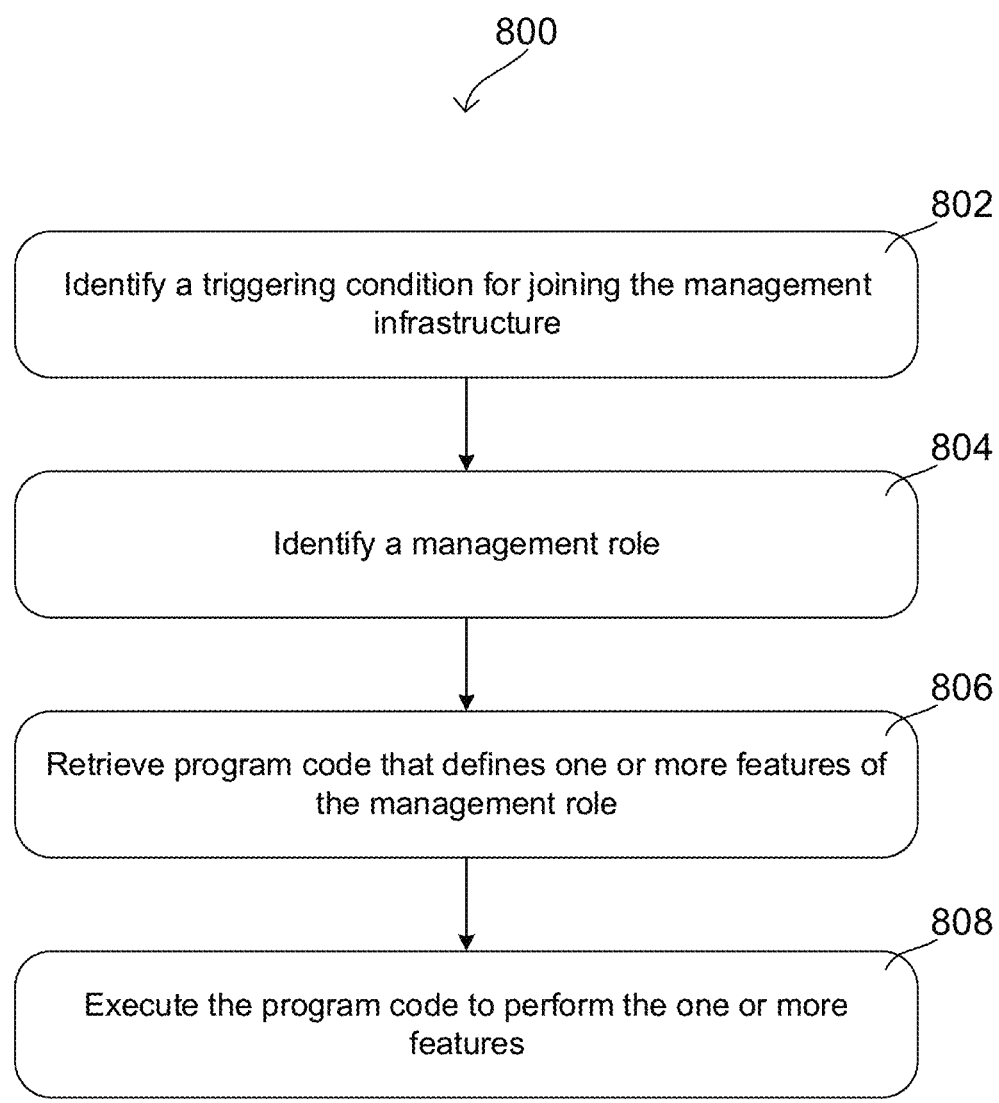
FIG. 8 shows an exemplary flow chart for joining a drone-based management infrastructure according to some aspects.

FIG. 8 shows exemplary flow chart 800 detailing one example of how UAV 500 can join a drone-based management infrastructure according to some aspects. In this example, UAV 500 may initially not be part of the management infrastructure. In stage 802, UAV 500 may identify a triggering condition for joining a nearby management infrastructure in stage 802. For instance, a requesting UAV may be part of the nearby management infrastructure and may be seeking other UAVs to add to the management infrastructure. The requesting UAV may transmit a signaling message that requests nearby UAVs to join the management infrastructure. UAV 500 may receive the signaling message with its antenna 518 and communication chip 516, which may provide the signaling message to UAV 500's management processors 520. Management processors 520 may thus identify the triggering condition for joining the management infrastructure in stage 802 by detecting the signaling message.

Then, in stage 804, management processors 520 may identify a management role to assume. In some aspects, management processors 520 may generate and transmit a signaling message response that replies to the requesting UAV's signaling message. Management processors 520 may then exchange further signaling with the requesting UAV and, based on that further signaling, may select the management role for UAV 500 to assume. In one example, the requesting UAV may specify a management role that UAV 500 should assume.

Once management processors 520 identify a management role, management processors 520 may retrieve program code that defines one or more features of the management role in stage 806. Management processors 520 may perform this stage as described in the various previous examples. Then, management processors 520 may execute the program code and, under its control, perform the one or more features of the management role in stage 808.

With this procedure, UAV 500 may join a nearby management infrastructure and assume a management role within that infrastructure. In other cases, UAV 500 may play the role of the requesting UAV. For instance, UAV 500's management processors 520 may identify a triggering condition for requesting nearby UAVs to join the management infrastructure. Like explained above, management processors 520 may identify this triggering condition when, for example, UAV 500 is initially establishing the management infrastructure (e.g., in a dynamic manner, such as for a sporting event or other public event) or when the existing management infrastructure needs to add management nodes (e.g., when the management infrastructure is serving too many target devices). After management processors 520 identify the triggering condition, management processors 520 may generate and transmit a signaling message that requests for nearby UAVs to join the management infrastructure. Management processors 520 may then receive signaling message responses from nearby UAVs and add those responding UAVs to the management infrastructure.

Figure 9:
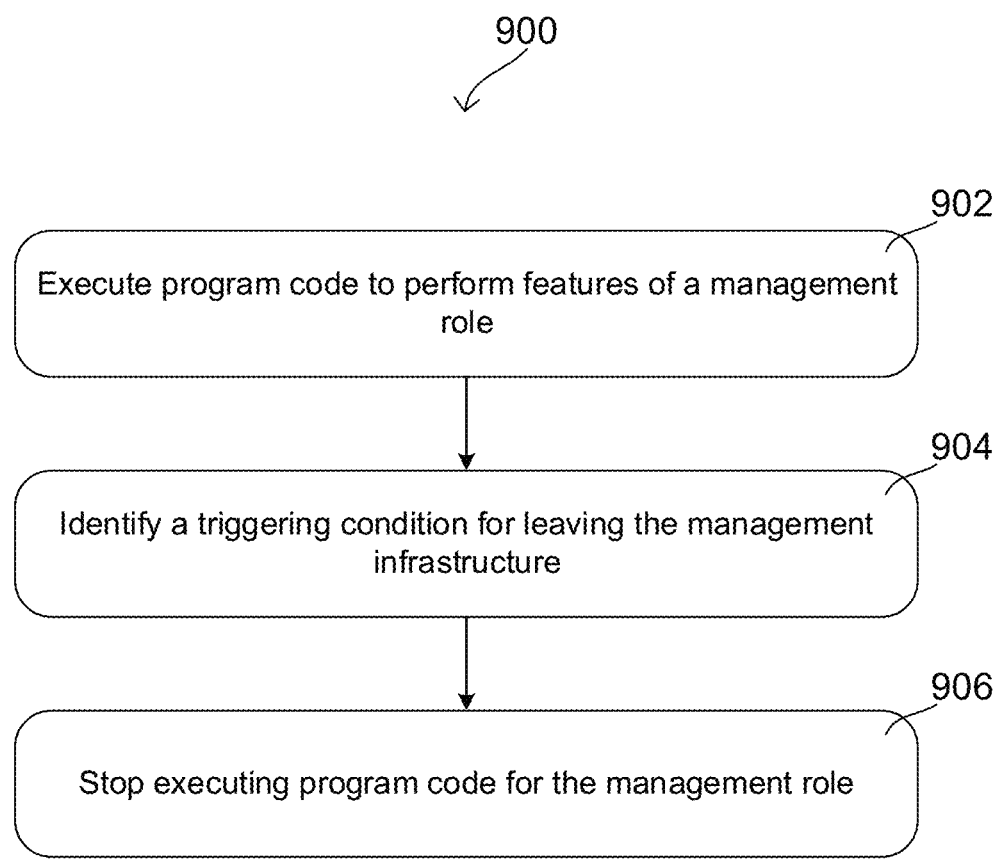
FIG. 9 shows an exemplary flow chart for leaving a drone-based management infrastructure according to some aspects

Using this feature, aspects of this disclosure may therefore adapt a management infrastructure to meet demands of the network, such as to add in nearby UAVs when demand is high. In some aspects, the management infrastructure may also remove UAVs from the management infrastructure, such as when demand drops. For example, after a sporting event is over, the management infrastructure may remove certain UAVs, or may even dissolve itself completely. FIG. 9 shows exemplary flow chart 900 describing how UAV 500 may leave a management infrastructure according to some aspects. As FIG. 9 shows, UAV 500 may first act in a given management role, and so may execute program code in stage 902 to perform the features of that management role. This can be any management role exemplified above, such as an NM, DM, EM, or NE role.

In stage 904, management processors 520 may identify a triggering condition for leaving the management infrastructure. In one example, a requesting UAV in the management infrastructure may transmit to UAV 500 a signaling message that requests UAV 500 to leave the management infrastructure. Management processors 520 may detect that signaling message and, in doing so, identify the triggering condition in stage 904. In another example, management processors 520 may monitor the network and detect the triggering condition based on that monitoring. For instance, management processors 520 may determine, based on the monitoring, that UAV 500 is performing less than a threshold level of computational work for the management infrastructure. As this may indicate low demand, UAV 500 may be able to leave the management infrastructure without significantly disrupting its operation. Thus, management processors 520 may identify the triggering condition in stage 904.

Because UAV 500 is leaving the management infrastructure, management processors 520 may stop executing the program code for the management role in stage 906. Thus, UAV 500 may cease actively being part of the management infrastructure. In some aspects, management processors 520 may transmit additional signaling to other UAVs in the management infrastructure to inform them that UAV 500 is leaving the management infrastructure.

In other examples, UAV 500 may act as a requesting UAV, and may generate and transmit signaling messages to other UAVs in the management infrastructure that request for them to leave the management infrastructure. In some cases, management processors 520 may generate and transmit these signaling messages when they identify a triggering condition. For instance, management processors 520 may monitor the network, such as to observe the number of target devices that are using the management infrastructure, or the amount of data traffic passing through the management infrastructure. If that metric falls below a predefined threshold, management processors 520 may identify that the triggering condition is met, and may transmit the signaling messages.

Thus, using the features described above, a management infrastructure may dynamically adjust its capacity based on demand. If more users connect to the network, the management infrastructure can respond to the added demand by adding more management nodes. The management infrastructure can then contract if demand drops.

In classical 3GPP networks, the management interfaces between OSs and NEs are typically fixed. Using NMs as an example, an NM will interface with a fixed set of DMs that does not change. By contrast, aspects of this disclosure may dynamically change the management interfaces. For instance, the various UAVs in the management infrastructure may communicate over wireless management interfaces that are dynamically configurable. These dynamic interfaces may operate alongside the other features described herein. For instance, when a UAV changes its management role, it may move to a different network layer (e.g., NM to DM, EM to NM, etc.). Thus, it may drop its previous management interfaces and establish new ones. Likewise, the management infrastructure may rearrange the management interfaces when a UAV joins or leaves (e.g., when the management infrastructure becomes more dense or sparse depending on the needs). When such changes happen, the affected UAVs may rearrange their management interfaces.

Figure 10:
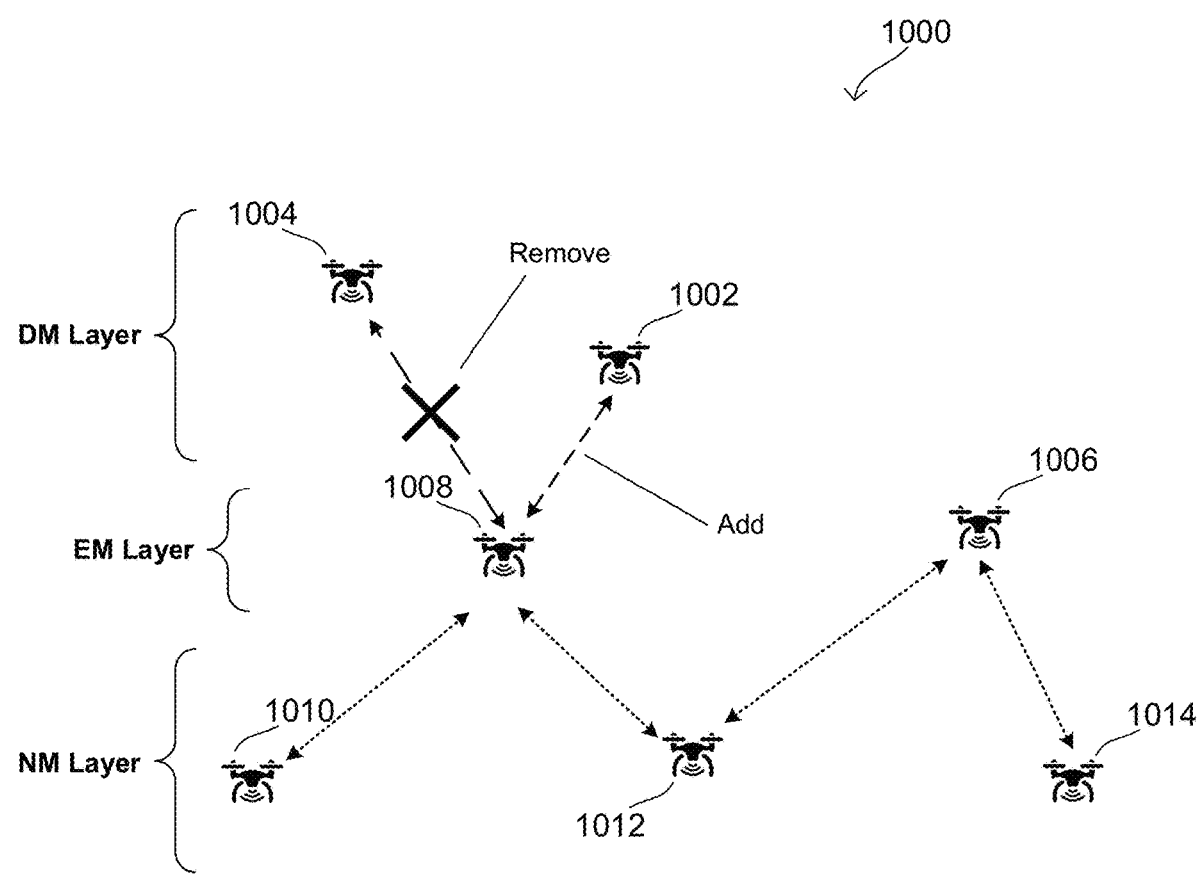
FIG. 10 shows an example of adapting wireless management interfaces according to some aspects.

FIG. 10 shows an example according to some aspects where the management infrastructure reconfigures its management interfaces. In this example, management infrastructure 1000 includes UAVs 1002-1014. UAV 1004 may initially serve as the DM for UAV 1008, which is in the EM layer. However, UAV 1004 may move so it is positioned too far from UAV 1008 to maintain the wireless management interface. Management interface 1000 may therefore reconfigure the management interface to recover from UAV 1004's departure. As shown in FIG. 10's example, UAV 1008 may cease using the management interface with UAV 1004. UAV 1002 may then take over for departed UAV 1004 by changing its role (if already part of management infrastructure 1000) or by joining management infrastructure 1000 (if not initially part of management infrastructure 1000). Thus, UAV 1002 may begin acting as a DM (executing features to manage the EM layer as a DM), and may establish a wireless management interface with UAV 1008. This ability to reconfigure may thus enable management infrastructure 1000 to adapt to varying conditions of its component UAVs.

As described above, various aspects of this disclosure can provide a management infrastructure with UAVs. In turn, this management infrastructure may support a radio communication network, thus providing a network for terminal devices to use. Returning to management infrastructure 400 in FIG. 4, UAVs 410-414 may be NE nodes that respectively serve coverage areas 416-420. In some cases, UAVs 410-414 may be base stations, while in other cases UAVs 410-414 may be other management nodes that interface with or control base stations in coverage areas 416-420.

In any case, UAVs 410-414 may provide some management services to coverage areas 416-420. Thus, management infrastructure 400 may support the radio communication network so that it can provide network connectivity to various terminal devices in coverage areas 416-420. Thus, when a source node (marked "S" in FIG. 4) wants to send data to a destination node (marked "D"), the source node may have an operating radio communication network to facilitate the communication. The source and destination nodes can be, for instance, terminal devices sending D2D communications to each other, or a base station sending data to a terminal device. In the example shown in FIG. 4, the source node may use a mesh network to route the data to the destination node via one or more relaying nodes, which can include UAVs 410-414.

Various examples above discussed how UAVs in a management infrastructure can use wireless management interfaces to exchange management information. In some aspects, the UAVs in the management infrastructure may also select which frequency bands to use for those wireless management interfaces. For instance, the UAVs may be configured to wirelessly communicate over different frequency bands. These frequency bands can include, for example, low GHz frequency bands, medium-range GHz frequency bands, and high-range GHz and mmWave frequency bands.

Low GHz frequency bands may be between 900 MHz-2 GHz, and typically may have good multipath propagation characteristics. Because low-frequency carriers experience less attenuation when they pass through objects, these low GHz frequency bands generally propagate farther than medium- and high-frequency bands. As such, communication links may generally be stable when they use these low GHz frequency carriers, even when obstacles are present. There is a tradeoff between propagation and bandwidth, however. Because this frequency range is relatively small, the available bandwidth is relatively limited, especially when compared to carriers in the high GHz range. Because of this low bandwidth, many low GHz frequency carriers may only provide low-throughput services.

Medium-range GHz frequency bands, on the other hand, may be around 5-6 GHz. These medium-frequency carriers have properties that fall between the high-propagation/low-bandwidth low-frequency carriers and the low-propagation/high-bandwidth high-frequency carriers. They typically have average multipath propagation characteristics and generally stable communication links as long as there are few obstacles. Compared to low-frequency carriers, these medium-frequency carriers have more bandwidth and can provide higher throughput.

Lastly, high-range GHz and mmWave frequency bands typically fall in the 28-60 GHz range. Because such high-frequency carriers experience very high attenuation, they typically can only use line-of-sight (LOS) communication. On the other hand, they may have more bandwidth, and may therefore provide much higher throughput than low frequency carriers. This combination of LOS and high throughput makes high-frequency carriers suitable for backbone connections.

In some aspects, the UAVs operating in the management infrastructure may be configured to select, from these options, a frequency band to use for their wireless management interfaces. This is referred to herein as a multi-band scheduler. For instance, UAV 500's management processors 520 may include multi-band scheduler features, which may select a frequency band for UAV 500 to use for its wireless management interfaces with other UAVs in the management infrastructure. With the multi-band scheduler, management processors 520 may identify available frequency bands and select a frequency band for a wireless management interface based on various criteria. Management processors 520 may base that selection on, for example, interference levels, information from the ground base infrastructure, and information about what the management interface will be used for.

Figure 11:
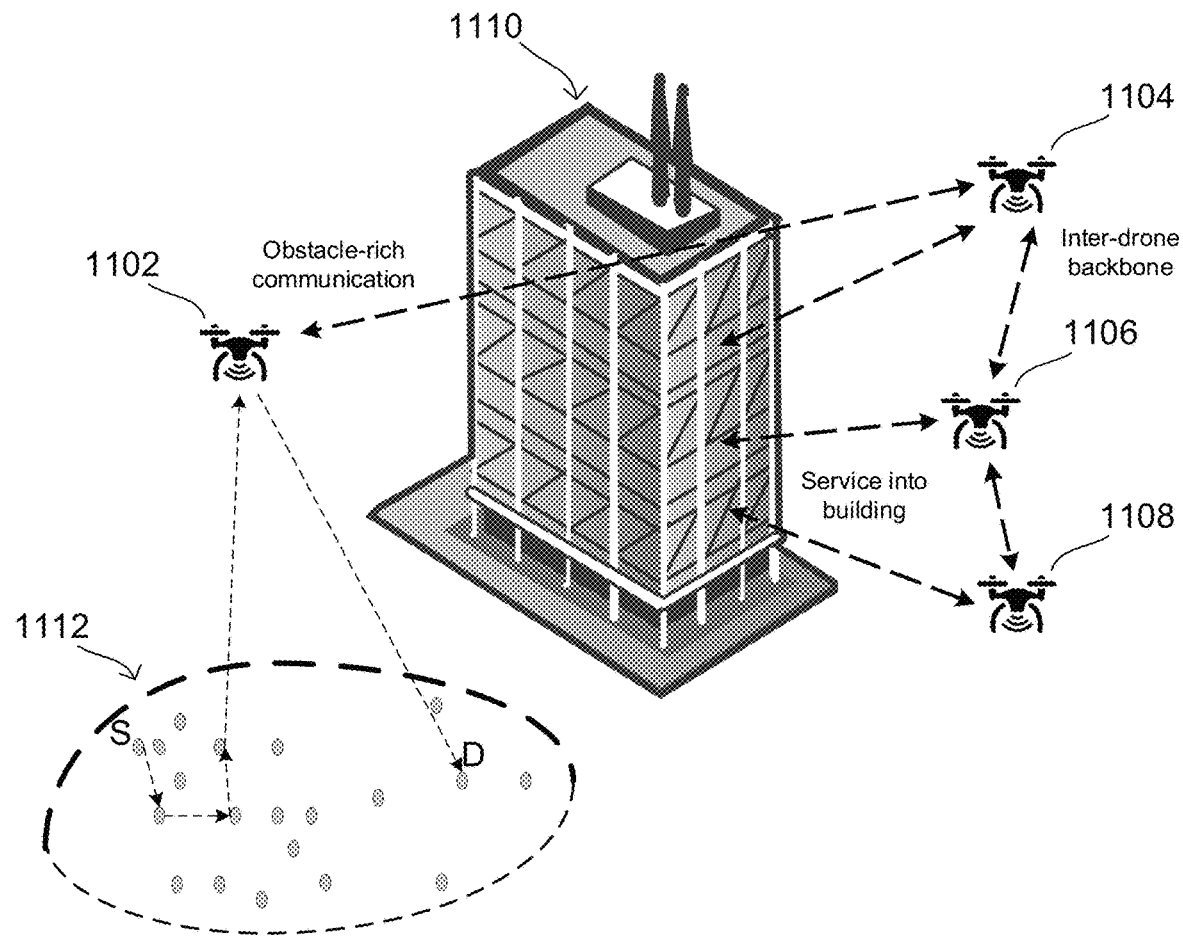
FIG. 11 shows an example of UAVs selecting frequency bands for wireless management interfaces according to some aspects.

FIG. 11 shows an example of how UAVs can select a frequency band for a wireless management interface according to some aspects. UAVs 1102-1108 may form part of a management infrastructure, and may operate various wireless management interfaces. However, UAVs 1102-1108 may have different service types and different surrounding conditions. For instance, UAV 1102 may engage in communications with many obstacles around, such as when UAV 1102 serves many target devices in a crowded urban area. Since these obstacles can attenuate wireless signals, UAV 1102 may select a low-frequency carrier to use for its wireless management interfaces. This low-frequency carrier may be, for example, around 1 GHz.

On the other hand, when UAV 1102 communicates with UAV 1104, and likewise when UAVs 1104-1108 communicate with each other, they may use LOS communications. Because there may not be many obstacles in these inter-drone backbone links, UAVs 1102-1108 may use high-frequency, high-throughput LOS wireless management interfaces to communicate with each other. This link can use, for example, a frequency carrier around 60 GHz.

As FIG. 11 shows, UAVs 1104-1108 may also provide service to target devices in a building. Because they pass through a building, these links may require some extra robustness for multipath penetration through walls and windows. UAVs 1104-1108 may use medium-range frequency carriers of around 5-6 GHz for these links.

Figure 12:
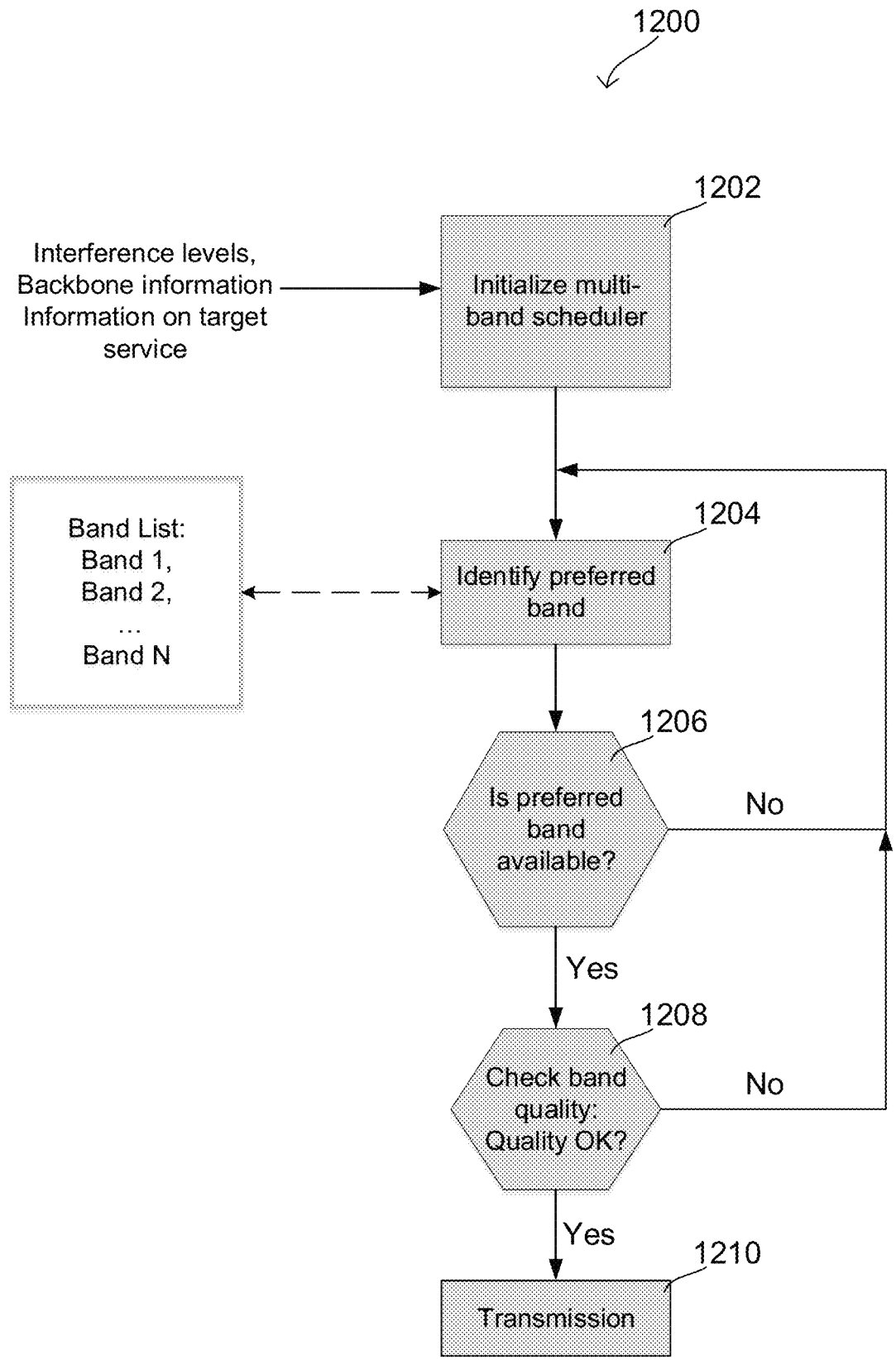
FIG. 12 shows an exemplary flow chart for selecting a frequency band for a wireless management interface according to some aspects.

FIG. 12 shows exemplary flow chart 1200 according to some aspects. Flow chart 1200 describes an example of how a UAV's management processors may select a frequency band for a wireless management interface. For instance, UAV 500's management processors 520 may be configured to retrieve and execute program code for the multi-band scheduler, which is a set of decisions to select a frequency band for a wireless management interface. The operations described herein for the multi-band scheduler may therefore be embodied as executable program code.

As FIG. 12 shows, management processors 520 may first initialize the multi-band scheduler in stage 1202. In this stage, management processors 520 may collect information that the multi-band scheduler uses to select a frequency band. This band selection information includes interference levels, backbone information, and information on the target service. UAV 500's communication chip 516 may be configured to perform radio measurements and, based on the radio measurements, obtain interference levels for a plurality of frequency bands. Communication chip 516 may provide these interference levels to management processors 520. The backbone information may be information about the wireless propagation conditions around UAV 500. For instance, this backbone information can indicate whether there are many obstacles around UAV 500, whether UAV 500 is in a congested or open area, whether UAV 500 is in a rural, suburban, or rural area, or any other information about how wireless signals will propagate around UAV 500. The information on the target service may indicate what type of information is delivered over the wireless management interface. For instance, the information on the target service may indicate whether the management interface is used for delivering service to end users, or to provide an inter-drone backbone. Management processors 520 may have this information as part of the information about the management infrastructure.

After obtaining the band selection information, management processors 520 may proceed to stage 1204, where it may select a preferred band from the plurality of frequency bands. This plurality of frequency bands, marked as "Band 1" to "Band N" in FIG. 12, may be a set of frequency bands that UAV 500 is configured to use for the wireless management interface. To select the preferred band in stage 1204, management processors 520 may evaluate the band selection information and select the preferred band based on that information. For instance, if the interference levels in the band selection information indicate that a frequency band has high interference, management processors 520 may not select that frequency band as the preferred band. Similarly, if the information on the target service indicates that the wireless management interface needs to support high throughput, management processors 520 may select a high-frequency or medium-frequency band as the preferred band. In some aspects, management processors 520 may use predefined weighting criteria to select the preferred band. These criteria may weight, for each frequency band, the interference levels, backbone information, and information on the target service with different weights. Management processors 520 may then identify which frequency band has the highest summed weight and then select that frequency band as the preferred band in stage 1204.

After selecting the preferred band, management processors 520 may determine whether the preferred band is available in stage 1206. For instance, in some scenarios, other UAVs, or other wireless devices, may already be using the preferred band, making it unavailable. If management processors 520 determine that the preferred band is not available, management processors 520 may return to stage 1204, and select the next-preferred band (e.g., the frequency band with the next-highest summed weights, or next-best band selection information) in stage 1206. Conversely if the preferred band is available, management processors 520 may proceed to stage 1208.

In stage 1208, management processors 520 may determine whether the band quality of the preferred band is acceptable or not. For instance, communication chip 516 may perform a radio measurement and provide it to management processors 520. The radio measurement can be, for example, a signal strength or a signal quality measurement. If the radio measurement indicates the band quality is above a predefined threshold, management processors 520 may determine that the band quality is acceptable, and proceed to stage 1210. Otherwise, management processors 520 may return to stage 1204, where they may evaluate the next-preferred band.

If management processors 520 reach stage 1210, they may select the preferred band (currently being evaluated) as a selected frequency band. Management processors 520 may then begin transmitting management information with the selected frequency band, using this selected frequency band as the wireless management interface. In some aspects, management processors 520 may transmit, to other UAVs or other target devices, signaling messages that indicate the selected frequency band. This informs the other devices of the selected frequency band so they also can begin using the selected frequency band for the wireless management interface. Using FIG. 11 as one example, UAV 1104 may execute flow chart 1200 with its management processors 520, and in doing so may select a selected frequency band to use for the inter-drone backbone with UAVs 1106 and 1108. Once UAV 1104's management processors select the selected frequency band at stage 1210 of flow chart 1200, UAV 1104 may transmit to UAVs 1106 and 1108 signaling messages that identify the selected frequency band. This informs UAVs 1106 and 1108 which frequency band to use for the wireless management interface over the inter-drone backbone, and UAVs 1104-1108 may proceed to using that selected frequency band to exchange management information.

In some aspects, after a UAV selects a selected frequency band, it may negotiate with other UAVs to select a negotiated frequency band to use for the wireless management interface. For instance, continuing with the last example, at stage 1210 UAV 1104 may select a selected frequency band and transmit to UAVs 1106 and 1108 signaling message that identifies the selected frequency band. UAVs 1106 and/or 1108 may then respond (e.g., with their management processors 520) with signaling messages that propose another frequency band. In this manner, UAVs 1104-1108 may negotiate with each other to agree on a negotiated frequency band. UAVs 1104-1108 may then use that negotiated frequency band for the wireless management interface.

Figure 13:
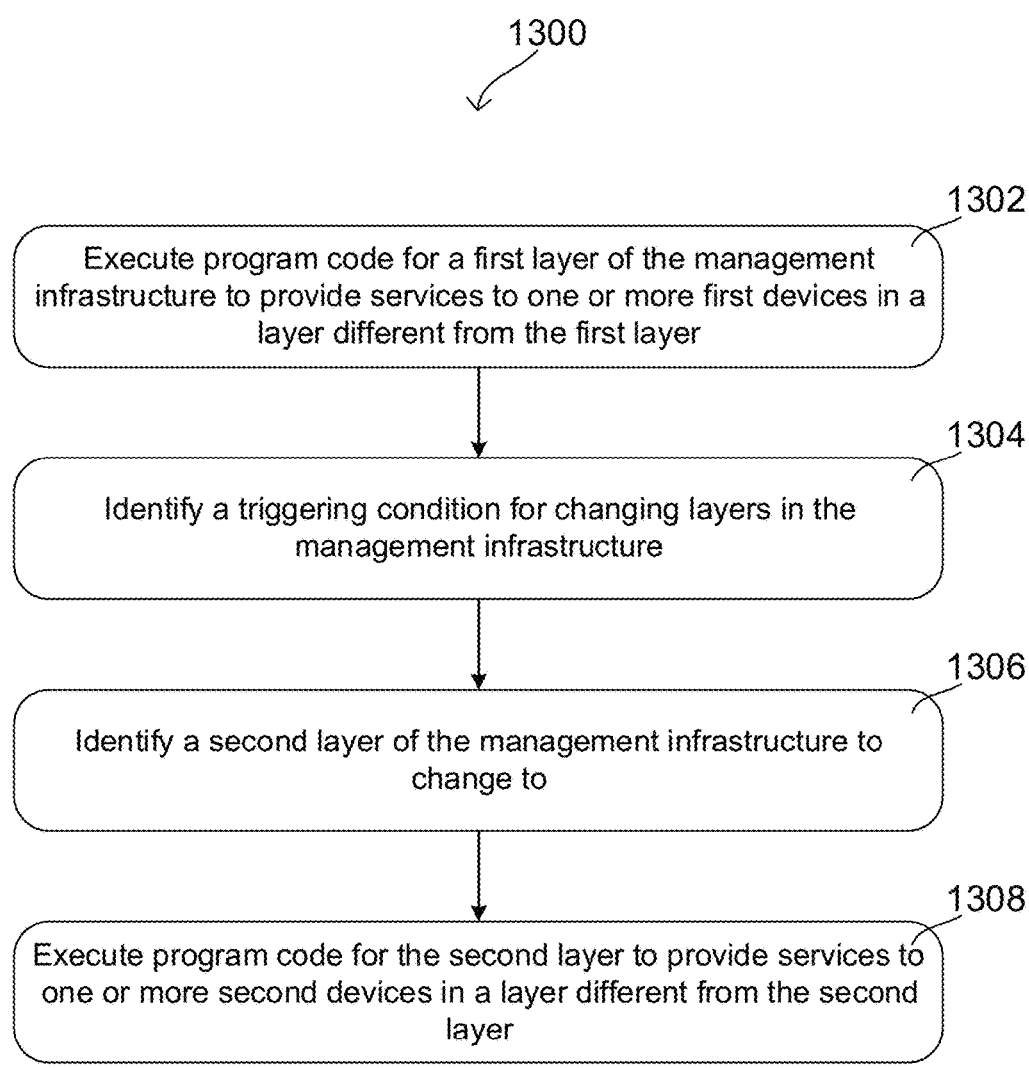
FIGS. 13 and 14 show exemplary methods of wireless communication at a UAV according to some aspects.

FIG. 13 shows exemplary method 1300 of performing wireless communications at a UAV in a management infrastructure that comprises multiple layers that manage components of a radio communication network for a network provider according to some aspects. As shown in FIG. 13, method 1300 includes executing program code for a first layer of the management infrastructure to provide services to one or more first devices in a layer different from the first layer (stage 1302), identifying a triggering condition for changing layers in the management infrastructure (stage 1304), identifying a second layer of the management infrastructure to change to (stage 1306), and executing program code for the second layer to provide services to one or more second devices in a layer different from the second layer (stage 1308).

Figure 14:
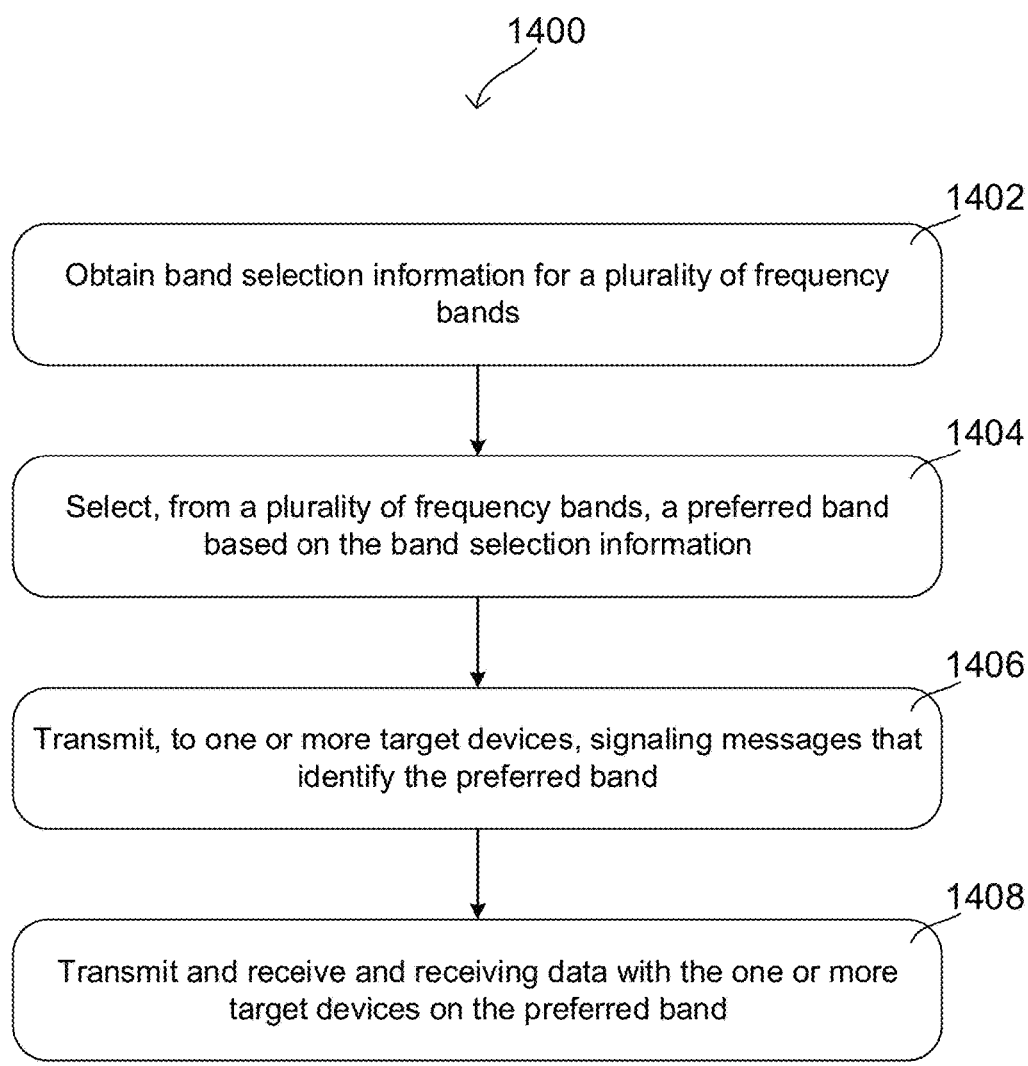

FIG. 14 shows exemplary method 1400 of performing wireless communications at a UAV according to some aspects. As shown in FIG. 14, method 1400 includes obtaining band selection information for a plurality of frequency bands (stage 1402), selecting, from a plurality of frequency bands, a preferred band based on the band selection information (stage 1404), transmitting, to one or more target devices, signaling messages that identify the preferred band (stage 1406), and transmitting and receiving data with the one or more target devices on the preferred band (stage 1408).

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

The following examples pertain to further aspects of this disclosure:

Example 1 is an unmanned aerial vehicle (UAV) configured to operate in a management infrastructure, wherein the management infrastructure comprises multiple layers that manage components of a radio communication network for a network provider, the UAV comprising: a vehicle drive arrangement; and one or more processors configured to: execute program code for a first layer of the management infrastructure to provide services to one or more first devices in a layer different from the first layer; identify a triggering condition for changing layers in the management infrastructure; identify a second layer of the management infrastructure to change to; and execute program code for the second layer to provide services to one or more second devices in a layer different from the second layer.

In Example 2, the subject matter of Example 1 can optionally include wherein the vehicle drive arrangement comprises one or more drive motors and one or more propellers, wherein the vehicle drive arrangement is configured to aerially move the UAV.

In Example 3, the subject matter of Example 1 or 2 can optionally include wherein the management infrastructure is a Third Generation Partnership Project (3GPP) management infrastructure, and wherein the multiple layers comprise a network manager (NM) layer, a domain manager (DM) layer, an element manager (EM) layer, and a network element (NE) layer.

In Example 4, the subject matter of Example 1 or 2 can optionally include wherein the management infrastructure is a Third Generation Partnership Project (3GPP) management infrastructure, and wherein the multiple layers comprise one or more of a network manager (NM) layer, a domain manager (DM) layer, an element manager (EM) layer, or a network element (NE) layer.

In Example 5, the subject matter of any one of Examples 1 to 4 can optionally include wherein the second layer is a network manager layer, and wherein the one or more processors are configured to interface with and manage one or more UAVs in a domain manager layer below the network manager layer.

In Example 6, the subject matter of any one of Examples 1 to 4 can optionally include wherein the second layer is a domain manager layer, and wherein the one or more processors are configured to manage a sub-network of UAVs in one or more layers below the domain manager layer.

In Example 7, the subject matter of Example 6 can optionally include wherein the sub-network comprises one or more UAVs in an element manager layer of the management infrastructure.

In Example 8, the subject matter of any one of Examples 1 to 4 can optionally include wherein the second layer is an element manager layer, and wherein the one or more processors are configured to manage a group of network elements that perform a similar communication service for the radio communication network.

In Example 9, the subject matter of Example 8 can optionally include wherein the group of network elements comprise radio access network components or core network components.

In Example 10, the subject matter of any one of Examples 1 to 4 can optionally include wherein the second layer is a network element layer, and wherein the one or more processors are configured to operate as a radio access network component or a core network component of the network element layer.

In Example 11, the subject matter of any one of Examples 1 to 10 can optionally include wherein the one or more first devices comprise UAVs operating in the layer different from the first network layer.

In Example 12, the subject matter of any one of Examples 1 to 11 can optionally include wherein the one or more first devices comprise network elements that are part of a radio access network or a core network of the radio communication network.

In Example 13, the subject matter of any one of Examples 1 to 12 can optionally include wherein the one or more processors are configured to identify the triggering condition for changing layers by: monitoring the number of one or more first devices to which the UAV provides services; and identifying the triggering condition based on the number of one or more first devices.

In Example 14, the subject matter of any one of Examples 1 to 12 can optionally include wherein the one or more processors are configured to identify the triggering condition for changing layers by: monitoring a battery power level of the UAV; and identifying the triggering condition if the battery power level is below a predefined threshold.

In Example 15, the subject matter of any one of Examples 1 to 12 can optionally include wherein the one or more processors are configured to identify the triggering condition for changing layers by: receiving, from a second UAV, a signaling message that requests the UAV to change layers; and identifying the triggering condition based on the signaling message.

In Example 16, the subject matter of any one of Examples 1 to 12 can optionally include wherein the one or more processors are configured to identify the triggering condition for changing layers by: monitoring a position of the UAV relative to the one or more first devices; and identifying the triggering condition based on the position.

In Example 17, the subject matter of any one of Examples 1 to 16 can optionally include further comprising a communication chip and an antenna, wherein the one or more processors are configured to establish, with the communication chip and the antenna, one or more wireless interfaces with the one or more second devices.

In Example 18, the subject matter of Example 17 can optionally include wherein the one or more processors are configured to terminate one or more wireless interfaces with the one or more first devices after identifying the triggering condition for changing layers.

In Example 19, the subject matter of any one of Examples 1 to 18 can optionally include wherein the one or more processors are configured to: before executing the program code for the first layer, receive a signaling message from a second UAV that requests for the UAV to join the management infrastructure; and start executing the program code for the first layer based on the signaling message.

In Example 20, the subject matter of any one of Examples 1 to 19 can optionally include further comprising a communication chip and an antenna, wherein the one or more processors are configured to, with the communication chip and the antenna, transmit and receive data with the one or more first devices.

In Example 21, the subject matter of Example 20 can optionally include wherein the one or more processors are further configured to: select, from a plurality of frequency bands, a preferred band; and transmit and receive data with the one or more first devices on the preferred band.

In Example 22, the subject matter of Example 21 can optionally include wherein the one or more processors are configured to select the preferred band based on interference levels of the plurality of frequency bands, backbone information about propagation conditions around the UAV, r information about the services provided to the one or more first devices.

In Example 23, the subject matter of Example 21 or 22 can optionally include wherein the one or more processors are configured to transmit, to the one or more first devices, signaling messages that identify the preferred band.

Example 24 is a method of performing wireless communications at an unmanned aerial vehicle (UAV) in a management infrastructure that comprises multiple layers that manage components of a radio communication network for a network provider, the method comprising: executing program code for a first layer of the management infrastructure to provide services to one or more first devices in a layer different from the first layer; identifying a triggering condition for changing layers in the management infrastructure; identifying a second layer of the management infrastructure to change to; and executing program code for the second layer to provide services to one or more second devices in a layer different from the second layer.

In Example 25, the subject matter of Example 24 can optionally include wherein the management infrastructure is a Third Generation Partnership Project (3GPP) management infrastructure, and wherein the multiple layers comprise a network manager (NM) layer, a domain manager (DM) layer, an element manager (EM) layer, and a network element (NE) layer.

In Example 26, the subject matter of Example 24 or 25 can optionally include wherein the management infrastructure is a Third Generation Partnership Project (3GPP) management infrastructure, and wherein the multiple layers comprise one or more of a network manager (NM) layer, a domain manager (DM) layer, an element manager (EM) layer, or a network element (NE) layer.

In Example 27, the subject matter of any one of Examples 24 to 26 can optionally include wherein the second layer is a network manager layer, and wherein executing the program code for the second layer to provide services to the one or more second devices comprises interfacing with and managing one or more UAVs in a domain manager layer below the network manager layer.

In Example 28, the subject matter of any one of Examples 24 to 26 can optionally include wherein the second layer is a domain manager layer, and wherein executing the program code for the second layer to provide services to the one or more second devices comprises managing a sub-network of UAVs in one or more layers below the domain manager layer.

In Example 29, the subject matter of Example 28 can optionally include wherein the sub-network comprises one or more UAVs in an element manager layer of the management infrastructure.

In Example 30, the subject matter of any one of Examples 24 to 26 can optionally include wherein the second layer is an element manager layer, and wherein executing the program code for the second layer to provide services to the one or more second devices comprises managing a group of network elements that perform a similar communication service for the radio communication network.

In Example 31, the subject matter of Example 30 can optionally include wherein the group of network elements comprise radio access network components or core network components.

In Example 32, the subject matter of any one of Examples 24 to 26 can optionally include wherein the second layer is a network element layer, and wherein executing the program code for the second layer to provide services to the one or more second devices comprises operating as a radio access network component or a core network component of the network element layer.

In Example 33, the subject matter of any one of Examples 24 to 32 can optionally include wherein the one or more first devices comprise UAVs operating in the layer different from the first network.

In Example 34, the subject matter of any one of Examples 24 to 33 can optionally include wherein the one or more first devices comprise network elements that are part of a radio access network or a core network of the radio communication network.

In Example 35, the subject matter of any one of Examples 24 to 34 can optionally include wherein identifying the triggering condition for changing layers comprises: monitoring the number of one or more first devices to which the UAV provides services; and identifying the triggering condition based on the number of one or more first devices.

In Example 36, the subject matter of any one of Examples 24 to 34 can optionally include wherein identifying the triggering condition for changing layers comprises: monitoring a battery power level of the UAV; and identifying the triggering condition if the battery power level is below a predefined threshold.

In Example 37, the subject matter of any one of Examples 24 to 34 can optionally include wherein identifying the triggering condition for changing layers comprises: receiving, from a second UAV, a signaling message that requests the UAV to change layers; and identifying the triggering condition based on the signaling message.

In Example 38, the subject matter of any one of Examples 24 to 34 can optionally include wherein identifying the triggering condition for changing layers comprises: monitoring a position of the UAV relative to the one or more first devices; and identifying the triggering condition based on the position.

In Example 39, the subject matter of any one of Examples 24 to 38 can optionally include further comprising, after identifying the triggering condition for changing layers, establishing one or more wireless interfaces with the one or more second devices.

In Example 40, the subject matter of Example 39 can optionally include further comprising terminating one or more wireless interfaces with the one or more first devices after identifying the triggering condition for changing layers.

In Example 41, the subject matter of any one of Examples 24 to 40 can optionally include further comprising: before executing the program code for the first layer, receiving a signaling message from a second UAV that requests for the UAV to join the management infrastructure; and starting to execute the program code for the first layer based on the signaling message.

In Example 42, the subject matter of any one of Examples 24 to 41 can optionally include further comprising: selecting, from a plurality of frequency bands, a preferred band; and transmitting and receiving data with the one or more first devices on the preferred band.

In Example 43, the subject matter of Example 42 can optionally include wherein selecting the preferred band comprises selecting the preferred band based on interference levels of the plurality of frequency bands, backbone information about propagation conditions around the UAV, or information about the services provided to the one or more first devices.

In Example 44, the subject matter of Example or 43, can optionally include comprising transmitting, to the one or more first devices, signaling messages that identify the preferred band.

Example 45 is a non-transitory computer readable medium storing instructions that, when executed by one or more processors, cause the one or more processors to perform a method of operating an unmanned aerial vehicle (UAV) in a management infrastructure that comprises multiple layers that manage components of a radio communication network for a network provider, the method comprising: executing program code for a first layer of the management infrastructure to provide services to one or more first devices in a layer different from the first layer; identifying a triggering condition for changing layers in the management infrastructure; identifying a second layer of the management infrastructure to change to; and executing program code for the second layer to provide services to one or more second devices in a layer different from the second layer.

Example 47 is a communication subcomponent for an unmanned aerial vehicle (UAV) in a management infrastructure, wherein the management infrastructure comprises multiple layers that manage components of a radio communication network for a network provider, the communication arrangement comprising: an antenna; a communication chip connected to the antenna; and one or more processors configured to transmit and receive signals via a wireless interface provided by the antenna and the communication chip, and further configured to: execute program code for a first layer of the management infrastructure to provide services to one or more first devices in a layer different from the first layer; identify a triggering condition for changing layers in the management infrastructure; identify a second layer of the management infrastructure to change to; and execute program code for the second layer to provide services to one or more second devices in a layer different from the second layer.

In Example 47, the subject matter of Example 46 can optionally include wherein the management infrastructure is a Third Generation Partnership Project (3GPP) management infrastructure, and wherein the multiple layers comprise a network manager (NM) layer, a domain manager (DM) layer, an element manager (EM) layer, and a network element (NE) layer.

In Example 48, the subject matter of Example 46 can optionally include wherein the management infrastructure is a Third Generation Partnership Project (3GPP) management infrastructure, and wherein the multiple layers comprise one or more of a network manager (NM) layer, a domain manager (DM) layer, an element manager (EM) layer, or a network element (NE) layer.

In Example 49, the subject matter of any one of Examples 46 to 48 can optionally include wherein the second layer is a network manager layer, and wherein the one or more processors are configured to interface with and manage one or more UAVs in a domain manager layer below the network manager layer.

In Example 50, the subject matter of any one of Examples 46 to 48 can optionally include wherein the second layer is a domain manager layer, and wherein the one or more processors are configured to manage a sub-network of UAVs in one or more layers below the domain manager layer.

In Example 51, the subject matter of Example 50 can optionally include wherein the sub-network comprises one or more UAVs in an element manager layer of the management infrastructure.

In Example 52, the subject matter of any one of Examples 46 to 48 can optionally include wherein the second layer is an element manager layer, and wherein the one or more processors are configured to manage a group of network elements that perform a similar communication service for the radio communication network.

In Example 53, the subject matter of Example 52 can optionally include wherein the group of network elements comprise radio access network components or core network components.

In Example 54, the subject matter of any one of Examples 46 to 48 can optionally include wherein the second layer is a network element layer, and wherein the one or more processors are configured to operate as a radio access network component or a core network component of the network element layer.

In Example 55, the subject matter of any one of Examples 46 to 54 can optionally include wherein the one or more first devices comprise UAVs operating in the layer different from the first network layer.

In Example 56, the subject matter of any one of Examples 46 to 55 can optionally include wherein the one or more first devices comprise network elements that are part of a radio access network or a core network of the radio communication network.

In Example 57, the subject matter of any one of Examples 46 to 56 can optionally include wherein the one or more processors are configured to identify the triggering condition for changing layers by: monitoring the number of one or more first devices to which the UAV provides services; and identifying the triggering condition based on the number of one or more first devices.

In Example 58, the subject matter of any one of Examples 46 to 56 can optionally include wherein the one or more processors are configured to identify the triggering condition for changing layers by: monitoring a battery power level of the UAV; and identifying the triggering condition if the battery power level is below a predefined threshold.

In Example 59, the subject matter of any one of Examples 46 to 56 can optionally include wherein the one or more processors are configured to identify the triggering condition for changing layers by: receiving, from a second UAV, a signaling message that requests the UAV to change layers; and identifying the triggering condition based on the signaling message.

In Example 60, the subject matter of any one of Examples 46 to 56 can optionally include wherein the one or more processors are configured to identify the triggering condition for changing layers by: monitoring a position of the UAV relative to the one or more first devices; and identifying the triggering condition based on the position.

In Example 61, the subject matter of any one of Examples 46 to 60 can optionally include wherein the one or more processors are configured to establish, with the communication chip and the antenna, one or more wireless interfaces with the one or more second devices.

In Example 62, the subject matter of Example 61 can optionally include wherein the one or more processors are configured to terminate one or more wireless interfaces with the one or more first devices after identifying the triggering condition for changing layers.

In Example 63, the subject matter of any one of Examples 46 to 62 can optionally include wherein the one or more processors are configured to: before executing the program code for the first layer, receive a signaling message from a second UAV that requests for the UAV to join the management infrastructure; and start executing the program code for the first layer based on the signaling message.

In Example 64, the subject matter of any one of Examples 46 to 63 can optionally include wherein the one or more processors are configured to, with the communication chip and the antenna, transmit and receive data with the one or more first devices.

In Example 65, the subject matter of Example 64 can optionally include wherein the one or more processors are further configured to: select, from a plurality of frequency bands, a preferred band; and transmit and receive data with the one or more first devices on the preferred band.

In Example 66, the subject matter of Example 65 can optionally include wherein the one or more processors are configured to select the preferred band based on interference levels of the plurality of frequency bands, backbone information about propagation conditions around the UAV, or information about the services provided to the one or more first devices.

In Example 67, the subject matter of Example 65 or 66 can optionally include wherein the one or more processors are configured to transmit, to the one or more first devices, signaling messages that identify the preferred band.

Example 68 is an unmanned aerial vehicle (UAV) comprising: a vehicle drive arrangement; and one or more processors configured to: obtain band selection information for a plurality of frequency bands; select, from a plurality of frequency bands, a preferred band based on the band selection information; transmit, to one or more target devices, signaling messages that identify the preferred band; transmit and receive data with the one or more target devices on the preferred band.

In Example 69, the subject matter of Example 68 can optionally include further comprising a communication chip and an antenna, wherein the one or more processors are configured to transmit and receive the data over a wireless interface provided by via the communication chip and the antenna.

In Example 70, the subject matter of Example 68 or 69 can optionally include wherein the band selection information indicates interference levels of the plurality of frequency bands.

In Example 71, the subject matter of any one of Examples 68 to 70 can optionally include wherein the band selection information indicates wireless propagation conditions on the plurality of frequency bands.

In Example 72, the subject matter of any one of Examples 68 to 71 can optionally include wherein the band selection information comprises information about a type of service that the UAV provides to the one or more target devices.

Example 73 is a method of performing wireless communications at an unmanned aerial vehicle (UAV), the method comprising: obtaining band selection information for a plurality of frequency bands; selecting, from a plurality of frequency bands, a preferred band based on the band selection information; transmitting, to one or more target devices, signaling messages that identify the preferred band; transmitting and receiving data with the one or more target devices on the preferred band.

In Example 74, the subject matter of Example 68 or 69 can optionally include wherein the band selection information indicates interference levels of the plurality of frequency bands.

In Example 75, the subject matter of any one of Examples 68 to 70 can optionally include wherein the band selection information indicates wireless propagation conditions on the plurality of frequency bands.

In Example 76, the subject matter of any one of Examples 68 to 71 can optionally include wherein the band selection information comprises information about a type of service that the UAV provides to the one or more target devices.

Example 77 is a non-transitory computer readable medium storing instructions that, when executed by one or more processors of an unmanned aerial vehicle (UAV), cause the UAV to perform the method of any one of claims 24 to 44 or 73 to 77.

All acronyms defined in the above description additionally hold in all claims included herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication subcomponent for an unmanned aerial vehicle (UAV) in a management infrastructure, wherein the management infrastructure comprises multiple layers that manage components of a radio communication network for a network provider, the communication subcomponent comprising:
    an antenna;
    a communication chip connected to the antenna; and
    one or more processors configured to transmit and receive signals via a wireless interface provided by the antenna and the communication chip, and further configured to:
        execute program code for a first layer of the management infrastructure to provide services to one or more first devices in a layer different from the first layer;
        identify a triggering condition for changing layers in the management infrastructure;
        identify a second layer of the management infrastructure to change to; and
        execute program code for the second layer to provide services to one or more second devices in a layer different from the second layer;
    wherein the management infrastructure is a Third Generation Partnership Project (3GPP) management infrastructure, and wherein the multiple layers comprise a network manager (NM) layer and a domain manager (DM) layer according to 3GPP; and
    wherein the second layer is the network manager layer, and wherein the one or more processors are configured to interface with and manage one or more UAVs in the domain manager layer below the network manager layer.

2. The communication subcomponent of claim 1, wherein the second layer is a domain manager layer, and wherein the one or more processors are configured to manage a sub-network of UAVs in one or more layers below the domain manager layer.

3. The communication subcomponent of claim 2, wherein the sub-network comprises one or more UAVs in an element manager layer of the management infrastructure.

4. The communication subcomponent of claim 1, wherein the second layer is an element manager layer, and wherein the one or more processors are configured to manage a group of network elements that perform a similar communication service for the radio communication network.

5. The communication subcomponent of claim 4, wherein the group of network elements comprise radio access network components or core network components.

6. The communication subcomponent of claim 1, wherein the second layer is a network element layer, and wherein the one or more processors are configured to operate as a radio access network component or a core network component of the network element layer.

7. The communication subcomponent of claim 1, wherein the one or more first devices comprise UAVs operating in the layer different from the first layer.

8. The communication subcomponent of claim 1, wherein the one or more processors are configured to identify the triggering condition for changing layers by:
    monitoring the number of one or more first devices to which the UAV provides services; and
    identifying the triggering condition based on the number of one or more first devices.

9. The communication subcomponent of claim 1, wherein the one or more processors are configured to identify the triggering condition for changing layers by:
    monitoring a battery power level of the UAV; and
    identifying the triggering condition if the battery power level is below a predefined threshold.

10. The communication subcomponent of claim 1, wherein the one or more processors are configured to identify the triggering condition for changing layers by:
    receiving, from a second UAV, a signaling message that requests the UAV to change layers; and
    identifying the triggering condition based on the signaling message.

11. The communication subcomponent of claim 1, wherein the one or more processors are configured to identify the triggering condition for changing layers by:
    monitoring a position of the UAV relative to the one or more first devices; and
    identifying the triggering condition based on the position.

12. The communication subcomponent of claim 1, wherein the one or more processors are configured to:
    before executing the program code for the first layer, receive a signaling message from a second UAV that requests for the UAV to join the management infrastructure; and
    start executing the program code for the first layer based on the signaling message.

13. The communication subcomponent of claim 1, wherein the one or more processors are configured to, with the communication chip and the antenna, transmit and receive data with the one or more first devices.

14. The communication subcomponent of claim 13, wherein the one or more processors are further configured to:
    select, from a plurality of frequency bands, a preferred band; and
    transmit and receive data with the one or more first devices on the preferred band.

15. An unmanned aerial vehicle (UAV) configured to operate in a management infrastructure, wherein the management infrastructure comprises multiple layers that manage components of a radio communication network for a network provider, the UAV comprising:
    a vehicle drive arrangement; and
    one or more processors configured to:
        execute program code for a first layer of the management infrastructure to provide services to one or more first devices in a layer different from the first layer;
        identify a triggering condition for changing layers in the management infrastructure;
        identify a second layer of the management infrastructure to change to; and execute program code for the second layer to provide services to one or more second devices in a layer different from the second layer;

wherein the management infrastructure is a Third Generation Partnership Project (3GPP) management infrastructure, and wherein the multiple layers comprise a network manager (NM) layer and a domain manager (DM) layer according to 3GPP; and wherein the second layer is the network manager layer, and wherein the one or more processors are configured to interface with and manage one or more UAVs in the domain manager layer below the network manager layer.

16. A method of performing wireless communications at an unmanned aerial vehicle (UAV) in a management infrastructure that comprises multiple layers that manage components of a radio communication network for a network provider, the method comprising:

executing program code for a first layer of the management infrastructure to provide services to one or more first devices in a layer different from the first layer;

identifying a triggering condition for changing layers in the management infrastructure;

identifying a second layer of the management infrastructure to change to; and executing program code for the second layer to provide services to one or more second devices in a layer different from the second layer;

wherein the management infrastructure is a Third Generation Partnership Project (3GPP) management infrastructure, and wherein the multiple layers comprise a network manager (NM) layer and a domain manager (DM) layer according to 3GPP; and wherein the second layer is the network manager layer, and wherein the one or more processors are configured to interface with and manage one or more UAVs in the domain manager layer below the network manager layer.

17. The method of claim 16, wherein the one or more first devices comprise UAVs operating in the layer different from the first layer.

* * * * *